United States Patent
Yamazaki et al.

(10) Patent No.: US 6,708,522 B2
(45) Date of Patent: *Mar. 23, 2004

(54) RECEIVER TANK FOR USE IN REFRIGERATION CYCLE, HEAT EXCHANGER WITH SAID RECEIVER TANK, AND CONDENSING APPARATUS FOR USE IN REFRIGERATION CYCLE

(75) Inventors: Keiji Yamazaki, Kawachi-gun (JP); Yoshihiko Seno, Oyama (JP); Osamu Kamoshida, Oyama (JP); Yasuhiro Takahashi, Tochigi (JP)

(73) Assignee: Showa Denko K.K., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/318,889

(22) Filed: Dec. 13, 2002

(65) Prior Publication Data

US 2003/0140652 A1 Jul. 31, 2003

Related U.S. Application Data

(63) Continuation-in-part of application No. 10/082,509, filed on Oct. 18, 2001, now Pat. No. 6,494,059, which is a continuation-in-part of application No. 09/716,397, filed on Nov. 20, 2000, now Pat. No. 6,330,810.

(30) Foreign Application Priority Data

Aug. 11, 2000 (JP) ........................................ 2000-244199

(51) Int. Cl.$^7$ ............................. F25B 43/00; F25B 39/04
(52) U.S. Cl. .......................................... 62/509; 62/474
(58) Field of Search ........................... 62/509, 474, 503

(56) References Cited

U.S. PATENT DOCUMENTS 6,330,810 B1 * 12/2001 Yamazaki et al. ............ 62/509
6,494,059 B2 * 12/2002 Yamazaki et al. ............ 62/509

* cited by examiner

Primary Examiner—William C. Doerrler

(57) ABSTRACT

A receiver-tank for use in a refrigeration cycle of this invention is provided with a filtering layer 435 formed so that an upper space 402 is formed above the filtering layer 435 in a tank main body 401. An upper end of a refrigerant outlet 441 in a tank bottom wall 421 is opened toward the upper space 402. The refrigerant flowed into the tank main body 401 from the refrigerant inlet 431 passes through the filtering layer 435 upwardly, and forms liquid-stagnation R in the upper space 402. The liquefied refrigerant of liquid-stagnation R flows out of the refrigerant outlet 441. Thereby, only the stable liquefied refrigerant can be extracted more assuredly.

27 Claims, 19 Drawing Sheets

RECEIVER TANK FOR USE IN REFRIGERATION CYCLE, HEAT EXCHANGER WITH SAID RECEIVER TANK, AND CONDENSING APPARATUS FOR USE IN REFRIGERATION CYCLE

This is a continuation-in-part of commonly assigned application Ser. No. 10/082,509 filed Oct. 18, 2001, now U.S. Pat. No. 6,494,059, and which is a continuation-in-part of commonly assigned application Ser. No. 09/716,397 filed Nov. 20, 2000, now U.S. Pat. No. 6,330,810.

BACKGROUND OF THE INVENTION

1. Field of the Invention

This invention relates to a receiver tank for use in a refrigeration cycle, a heat exchanger with a receiver tank, and a condensing apparatus for use in a refrigeration cycle, which can be applied to an air-conditioning system for automobile use, household use and business use.

2. Description of Related Art

FIG. 22 shows an expansion-valve system refrigeration cycle as one of typical refrigeration cycles. In the refrigeration cycle, the gaseous refrigerant of high temperature and high pressure sent out from a compressor CP is introduced into a condenser CD and exchanges heat with the ambient air to be cooled and condensed therein. The condensed refrigerant mostly in a liquefied state flows into a receiver-tank RT to be completely separated into gaseous refrigerant and liquefied refrigerant. Then, only the liquefied refrigerant flows out of the receiver-tank RT. The liquefied refrigerant is decompressed and expanded quickly by an expansion-valve EV, and is introduced into an evaporator EP as a mist-like refrigerant of low pressure and low temperature. This mist-like refrigerant evaporates in the evaporator EP by absorbing latent heat from the ambient air to be turned into gaseous refrigerant. Then, the gaseous refrigerant flows out of the evaporator EP, and is inhaled by the compressor CP.

In FIG. 22, the spotted area indicates that the refrigerant is in a liquid state. In the meantime, the refrigeration flow rate is controlled by adjusting the opening degree of the expansion-valve EV in response to the signal sent from a heat-sensitive-coupler SC provided at the outlet side of the evaporator EP.

Now, in a refrigeration cycle for automobile use, it is proposed that refrigerant condensed in a condenser CD is subcooled to a temperature lower than the condensation temperature of the refrigerant by about several degrees to increase the amount of heat release and thereafter the subcooled refrigerant is introduced into an expansion-valve EV and an evaporator EP to enhance the refrigerating capacity. Concretely, the subcooling portion, which subcools the refrigerant condensed by the condenser CD to a temperature lower than the condensation temperature of the refrigerant by several degrees centigrade, is provided so as to send the condensed refrigerant to the evaporator side as stabilized liquid refrigerant. Usually, this subcooling portion is arranged at the downstream side of the receiver-tank RT. In many cases, such a subcooling portion is integrally provided to the condenser CD (subcool system condenser) in view of space efficiency.

On the other hand, in many cases, a receiver-dryer is used as the aforementioned receiver-tank RT. The receiver-dryer is provided with a desiccant-filled-portion therein to absorb the moisture components of the refrigerant. Such a receiver-dryer includes the so-called sandwich-type receiver-dryer having an upper space 33 above a desiccant-filled portion 32 and a lower space 34 below the desiccant-filled portion 32 in a vertical tank 31 as shown in FIGS. 23A–23C, and the so-called bag-type receiver-dryer provided with a desiccant-filled portion 32 in one side in a vertical tank 31 as shown in FIG. 23D.

In the receiver-dryer having a sucking-pipe 36 shown in FIG. 23A, the refrigerant flowed into the upper space 33 via the refrigerant inlet 35 passes through the desiccant-filled-portion 32 to reach the lower space 34. Then, the liquefied refrigerant separated from the gaseous refrigerant is sucked up by the sucking-pipe 36 and flows out of the refrigerant outlet 37 provided at the top of the tank.

In the receiver-dryer having a supplying-pipe 38 shown in FIG. 23B, the refrigerant introduced from the refrigerant inlet 35 provided at the bottom portion flows up the supplying-pipe 38 to reach the upper space 33, and then passes through the desiccant-filled-portion 32 to reach the lower space 34. Then, the liquefied refrigerant separated from the gaseous refrigerant flows out of the refrigerant outlet 37 provided at the bottom of the tank.

In the inlet-outlet-confrontation-type receiver-dryer shown in FIG. 23C, the refrigerant introduced into the upper space 33 via the top refrigerant inlet 35 passes through the desiccant-filled-portion 32 to reach the lower space 34. Then, the liquefied refrigerant separated from the gaseous refrigerant flows out of the refrigerant outlet 37 provided at the bottom of the tank.

In the bag-type receiver-dryer shown in FIG. 23D, the refrigerant flowed into the tank via the refrigerant inlet 35 provided at the side portion of the tank contacts the desiccant-filed-portion 32, and the liquefied refrigerant separated from the gaseous refrigerant in the lower portion of the tank flows out of the refrigerant outlet 37 provided at the bottom of the tank.

In an air-conditioning system, it is always desired to improve the space efficiency and performance. Especially, in an automobile air-conditioner, in order to effectively use the limited body space, it is requested that the whole system be further miniaturized. In order to realize the aforementioned requests, it is necessary to reduce the amount of refrigerant sealed in the refrigeration cycle, to enhance the performance stability to load fluctuation (overcharge toughness) and to prevent performance deterioration with time due to a continuous running (decline of leakage toughness). For these purposes, it is desired to secure a steady region, i.e., a stable region in a subcooled state of the refrigerant to the amount of sealed refrigerant, as widely as possible.

FIG. 8 is a correlation characteristic figure showing the correlation between a subcooling degree of the condensed refrigerant and an amount of sealed refrigerant obtained by a charge examination (cycle bench) of an automobile air-conditioner. In this correlation characteristic figure, it is ideal that the rising curve is steep until it reaches a steady region as shown by the phantom-line curve X2 and that the steady region has a wider range.

However, in an automobile air-conditioner using a conventional subcooling system condenser, the rising curve is gentle until it reaches the steady region as shown by the solid-line curve Y. Therefore, the steady region starting point delays toward the larger amount of sealed refrigerant side, which results in a delayed refrigerant sealing timing and a narrow steady region width. This means that in the conventional automobile air-conditioner the miniaturization by decreasing the sealed refrigerant amount is difficult, the performance stability to load fluctuation is bad, and the performance tends to deteriorate with time due to a continuous running.

The inventors investigated causes of the above-mentioned problems of the conventional automobile air-conditioner from various aspects so as to realize a miniaturized high-performance automobile air-conditioner. Consequently, the inventors revealed that one factor of the above-mentioned problems resides in a structure of a conventional receiver-dryer RD. That is, since the interface between the liquefied refrigerant and the gaseous refrigerant, i.e., the surface of the liquefied refrigerant, near the refrigerant outlet of the receiver-dryer RD is hard to become stable, the stable supply of the liquefied refrigerant to the following cycle part cannot be performed. Furthermore, a large amount of gaseous refrigerant will be mixed into the liquefied refrigerant to be flowed out. Therefore, the above-mentioned steady region becomes narrower and the steady region starting point delays toward the larger amount of sealed refrigerant side.

That is, since a refrigerant flow velocity flowing into a receiver-dryer RD from a condenser CD is generally high, in a sandwich-type receiver-dryer, larger turbulence of the liquefied refrigerant occurs in the upper space 33 into which the refrigerant is introduced. Consequently, since the liquefied refrigerant stagnates in the upper space 33, the liquefied refrigerant is not fully supplied to the lower space 34. As a result, a few amount of liquefied refrigerant accumulated in the lower space 34 is disturbed by the high-speed liquid flow passed through the desiccant-filled-portion 32, which causes bubbles of gaseous refrigerant. For this reason, it is assumed that the gaseous refrigerant flows out of the refrigerant outlet 37 exposed to the gaseous phase due to large surface fluctuation, and/or a lot of air bubbles are involved into the liquefied refrigerant to be flowed out.

On the other hand, in the bag-type receiver-dryer, it is assumed that since the internal refrigerant flow velocity and the turbulence of the internal refrigerant are larger than in the sandwich-type receiver-dryer, the liquefied refrigerant surface near the refrigerant outlet 37 becomes further unstable, resulting in a larger outflow of gaseous refrigerant.

In view of the aforementioned technical background, the present invention has been made. It is an object of the present invention to provide a receiver-tank for a refrigeration cycle which is small in size, light in weight and small in refrigerant amount.

It is another object of the present invention to provide a receiver-tank for a refrigeration cycle which can enlarge the stable region of refrigerant to an amount of sealed refrigerant and supply the stable liquefied refrigerant to the following cycle portion.

It is still another object of the present invention to provide a condensing apparatus for use in a refrigeration cycle in which a surface of liquefied refrigerant separated from gaseous refrigerant can be stabilized and only the liquefied refrigerant can be supplied from the receiver-dryer to the subsequent cycle part.

It is still yet another object of the present invention to provide a receiver-dryer used for the above-mentioned condensing apparatus in which the surface of the liquefied refrigerant separated from the gaseous refrigerant can be stabilized and only the liquefied refrigerant can be supplied to the subsequent cycle part.

Another object of the present invention will be apparent from the following embodiments.

DISCLOSURE OF THE INVENTION

According to a first aspect of the present invention, a receiver-tank for use in a refrigeration cycle, wherein condensed refrigerant is introduced into the receiver-tank and accumulated therein and only liquefied refrigerant flows out of the receiver-tank, the receiver-tank comprises: a tank main body having a refrigerant inlet and a refrigerant outlet each provided in a bottom wall of the tank main body; a flow-resistance layer for reducing a flow velocity of a refrigerant passing through the flow-resistance layer, the flow-resistance layer being provided in the tank main body such that an upper space is formed above the flow-resistance layer; and a suction pipe provided in the tank main body, the suction pipe having an upper end opened toward the upper space and a lower end communicated with the refrigerant outlet, whereby refrigerant introduced into the tank main body via the refrigerant inlet passes through the flow-resistance layer upward to cause liquid stagnation of liquefied refrigerant in the upper space, and the liquefied refrigerant flows out of the refrigerant outlet via the suction pipe.

According to the first aspect of the present invention, the condensed refrigerant, which is a mixture of gaseous refrigerant and liquefied refrigerant, is abruptly diffused into a wide area of the inner bottom portion of the tank main body to thereby reduce the flow velocity immediately after introduced into the tank main body. Subsequently, the refrigerant goes up through the desiccant-filled-layer to further decrease the flow velocity.

Therefore, the liquefied refrigerant, which is slow in flow velocity as compared with gaseous refrigerant, passes through the desiccant-filled-layer to reach the upper space, which causes a reduced flow velocity. Accordingly, the liquefied refrigerant accumulates to create liquid stagnation in the upper space without causing turbulence. On the other hand, the flow velocity of the gaseous refrigerant also abruptly reduces when the gaseous refrigerant passes through the desiccant-filled-layer.

For this reason, when the gaseous refrigerant reaches the liquid stagnation created in the upper space, it slowly goes up in the liquid stagnation as bubbles. Consequently, the gaseous refrigerant passes through the surface of the liquid stagnation and accumulates above the surface without disturbing the surface.

Since the upper end of the suction pipe is located at the bottom of the liquid stagnation stably accumulated in the upper space, only the accumulated liquefied refrigerant flows into the suction pipe to be discharged from the refrigerant outlet.

Since only the liquefied refrigerant stably flows out from the receiver-dryer as mentioned above, it becomes possible to fill an appropriate amount of refrigerant in the refrigeration cycle at an earlier stage. Moreover, since the steady region between the optimum point and the excessive point of refrigerant amount can be expanded by using the surplus space in the receiver-dryer as a buffer space, the whole refrigeration cycle can be operated stably.

In the first aspect of the present invention, it is preferable that the flow-resistance layer is provided with a plurality of dispersing passages for dispersing the refrigerant in a radial and outward direction of the tank main body. For example, the flow-resistance layer may be formed by numerous particles, knitted fabrics, woven fabrics, non-woven fabrics, a porous or perforated panel/member or the lamination thereof, or a combination of one or more of the aforementioned members/materials.

In the first aspect of the present invention, it is preferable that the flow-resistance layer is a desiccant-filled-layer constituted by numerous particle-shaped desiccating agents. That is, in the receiver-tank for use in a refrigeration cycle, the desiccating agents are disposed in the receiver-tank in order to delete the moisture in a refrigerant. Accordingly, in the aforementioned structure, the flow-resistance layer can also be used as desiccating agents.

Furthermore, in the first aspect of the present invention, it is preferable that a lower space for diffusing the refrigerant introduced from the refrigerant inlet is formed under the flow-resistance-layer in the tank main body. In cases where the aforementioned structure is employed, the refrigerant introduced from the refrigerant inlet is diffused widely in the lower space, to thereby further reduce the flow velocity. Thus, occurrence of turbulence of refrigerant can be prevented effectively, resulting in a smooth creation of stable liquid stagnation.

Furthermore, in the first aspect of the present invention, it is preferable that a height of the lower space is 25% or less of a thickness of the flow-resistance layer. In this case, the lower space can be decreased while ensuring the flow decreasing function by the lower space. Therefore, turbulence of refrigerant hardly occurs, enabling an ample supply of liquid refrigerant to the upper space.

Furthermore, in the first aspect of the present invention, it is preferable that the suction pipe has an enlarged-diameter portion at an upper end thereof.

In this case, since the inlet side of the suction pipe forms a dented portion at the upper portion of the flow-resistance layer, the liquid refrigerant can be easily flowed into the suction pipe. Furthermore, the flow velocity of the liquefied refrigerant becomes slower than in a non-enlarged-diameter portion. Therefore, even if bubbles of the gaseous refrigerant exist in the enlarged-diameter portion, the bubbles can go up in the enlarged-diameter portion.

In order to enhance the function of the enlarged-diameter portion, in the first aspect of the present invention, it is preferable to employ the following structure.

That is, in the first aspect of the present invention, it is preferable that the following conditions are satisfied: $d1<d2\leqq 3d1$, and $d1<h1\leqq 5d1$, wherein an inner diameter of a non-enlarged-diameter portion of an intermediate portion of the suction pipe, the maximum opening diameter of the enlarged-diameter portion and a depth of the enlarged-diameter portion are defined by $d1$, $d2$ and $h1$, respectively.

Furthermore, in the first aspect of the present invention, it is preferable that an upwardly extended bubble-swallow-prevention wall is formed on a periphery of an upper end opening of the suction pipe. In this case, the bubbles of the gaseous refrigerant going up through the liquid stagnation created in the upper space will be hardly swallowed by the liquefied refrigerant flowing toward the suction pipe because of the existence of the bubble-swallow-prevention wall. Thus, it is possible to prevent the gaseous refrigerant from being swallowed into the suction pipe.

In order to enhance the function of the bubble-swallow-prevention wall, in the first aspect of the present invention, it is preferable to employ the following structure.

That is, in the present invention, it is preferable that the following conditions are satisfied: $h2\leqq 2d1$, wherein an inner diameter of a non-enlarged-diameter portion of an intermediate portion of the suction pipe and a height of the bubble-swallow-prevention wall are defined by $d1$ and $h2$, respectively.

Furthermore, in the present invention, it is preferable that the following conditions are satisfied: $1.5\phi<L1\leqq 0.8D$, wherein a distance between a center of the receiver-tank outlet and a center of the receiver-tank inlet, an inner diameter of the tank main body and an opening diameter of an outlet opening of the receiver-tank inlet are defined by $L1$, $D$ and $\phi$, respectively.

In this case, since the distance between the refrigerant inlet and the refrigerant outlet can be kept appropriately, it becomes possible to prevent the upstream of the refrigerant introduced from the refrigerant inlet from being biased toward the refrigerant outlet side, or the suction pipe side, resulting in more stable liquid stagnation.

Furthermore, it is preferable the following conditions are satisfied: $Ld\leqq 0.7Le$, wherein a thickness of the flow-resistance layer and an effective length of the tank main body are defined by $Ld$ and $Le$, respectively. In this case, enough space for accumulating gaseous refrigerant and liquefied refrigerant above the tank main body can be secured, resulting in a more stable supply of a liquefied refrigerant.

Furthermore, in the present invention, it is preferable that a filter layer is disposed on at least an upper surface of the desiccant-filled-layer, or a pair of perforated plates are disposed on upper and lower surfaces of the desiccant-filled-layer. In this case, the refrigerant passing through the filter layer or the perforated plates is rectified by the filter layer or the perforated plates. Thus, a partial high-speed flow will be extinguished, and liquefied refrigerant and gaseous refrigerant will be divided into minute refrigerant. Accordingly, the liquid stagnation in the upper space can be created stably.

Furthermore, in the present invention, it is preferable that inlets are disposed at predetermined circumferential intervals. In this case, refrigerant can be introduced into the tank main body evenly from the periphery of the bottom wall of the tank main body, which can assuredly prevent the generation of bubbles of refrigerant due to the turbulence or the like. As a result, stable liquid stagnation can be created.

According to a second aspect of the present invention, a receiver-tank for use in a refrigeration cycle, wherein condensed refrigerant is introduced into the receiver-tank and accumulated therein and only liquefied refrigerant flows out of the receiver-tank, the receiver-tank comprises: a tank main body having a refrigerant inlet and a refrigerant outlet each provided in a bottom wall of the tank main body; a flow-resistance layer for reducing a flow velocity of refrigerant passing through the flow-resistance layer, the flow-resistance layer being provided in the tank main body such that an upper space is formed above the flow-resistance layer; a suction pipe provided in the tank main body, the suction pipe having an upper end opened toward the upper space and a lower end communicated with the refrigerant outlet; and a desiccating-agent-filled member disposed in the upper space so as to space apart from the flow-resistance layer, whereby a refrigerant introduced into the tank main body via the refrigerant inlet passes through the flow-resistance layer upward to cause liquid stagnation of liquefied refrigerant in the upper space, and the liquefied refrigerant flows out of the refrigerant outlet via the suction pipe.

According to the second aspect of the present invention, in the same manner as in the first aspect of the present invention, since only the liquefied refrigerant stably flows out from the receiver-dryer, it becomes possible to fill an appropriate amount of the refrigerant in the refrigeration cycle at an earlier stage. Moreover, since the steady region between the optimum point and the excessive point of refrigerant amount can be expanded by using the surplus space in the receiver-dryer as a buffer space, the whole refrigeration cycle can be operated stably.

Furthermore, since the desiccating-agent-filled member is formed in the upper space in the tank main body, the moisture of the refrigerant passing through the tank main body can be deleted. Thus, appropriate refrigerant with no moisture can be discharged, resulting in a stable operation of the entire refrigeration cycle.

In the second aspect of the present invention, it is preferable that the flow-resistance layer maybe formed by numerous particles, knitted fabrics, woven fabrics, non-woven fabrics, a porous or perforated panel/member or the lamination thereof, or a combination of one or more of the aforementioned members/materials, or the flow-resistance layer is provided with a plurality of dispersing passages for dispersing the refrigerant in a radial and outward direction of the tank main body.

Furthermore, in the second aspect of the present invention, it is preferable that the flow-resistance layer is a desiccant-filled-layer constituted by numerous particle-shaped desiccating agents. In this case, it becomes possible to supply an enough amount of desiccating agents as the flow-resistance layer and the desiccating-agent-filled member.

In the second aspect of the present invention, it is preferable that desiccating-agent-filled member is immovably disposed or movably disposed in the upper space.

Furthermore, in the second aspect of the present invention, it is preferable that the following conditions are satisfied: Ld<D, wherein a thickness of the desiccating-agent-filled member and an inner diameter of the tank main body are defined by Ld and D, respectively. In this case, an enough space for accumulating the liquefied refrigerant and the gaseous refrigerant above the tank main body can be secured, resulting in a steady supply of liquefied refrigerant.

Furthermore, in the second aspect of the present invention, it is preferable that a lower space for diffusing the refrigerant introduced from the refrigerant inlet is formed under the flow-resistance-layer in the tank main body. In this case, the refrigerant introduced from the refrigerant inlet diffuses widely in the lower space, resulting in a reduced flow velocity. Thus, generation of turbulence in the lower space can be prevented more assuredly, which enables to create stable liquid stagnation.

Furthermore, in the second aspect of the present invention, it is preferable that the refrigerant outlet is formed at a center of the bottom wall of the tank main body and a plurality of the refrigerant inlets are formed around the refrigerant outlet. In this case, it becomes possible to introduce refrigerant into the tank main body from the peripheral portion of the bottom of the tank main body in a dispersed manner. Thus, generation of bubbles due to a biased flow and/or turbulence of refrigerant can be effectively prevented, which enables to create further stable liquid stagnation.

Furthermore, in the second aspect of the present invention, it is preferable that the plurality of the refrigerant inlets are disposed at predetermined circumferential intervals. In this case, the refrigerant can be introduced evenly into the tank main body from the peripheral portion of the bottom wall of the tank main body. Thus, generation of bubbles due to a biased flow and/or turbulence of refrigerant can be effectively prevented, which enables to create further stable liquid stagnation.

On the other hand, the aforementioned receiver-tank according to the first aspect of the present invention can be integrally assembled to a heat exchanger such as a condenser to form a heat exchanger with a receiver-tank.

According to a third aspect of the present invention, a heat exchanger with a receiver-tank, comprises: a heat exchanger body including a pair of headers disposed in parallel at a certain distance, a plurality of heat exchanging tubes with both ends thereof connected to the pair of headers and a condensing portion outlet for discharging refrigerant condensed while passing through the heat exchanging tubes; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant flowed out of the condensing portion outlet into the receiver-tank inlet, wherein a flow-resistance layer for reducing a flow velocity of refrigerant passing through the flow-resistance layer is provided in the receiver-tank such that an upper space is formed above the flow-resistance layer, wherein a suction pipe is provided in the tank main body, the suction pipe having an upper end opened toward the upper space and a lower end communicated with the refrigerant outlet, whereby refrigerant introduced into the tank main body via the refrigerant inlet passes through the flow-resistance layer upward to cause liquid stagnation of liquefied refrigerant in the upper space, and the liquefied refrigerant flows out of the refrigerant outlet via the suction pipe.

In the third aspect of the present invention, it is preferable that the flow-resistance layer is a desiccant-filled-layer constituted by numerous particle-shaped desiccating agents, or a lower space for diffusing the refrigerant introduced from the refrigerant inlet is formed under the flow-resistance-layer in the tank main body.

Furthermore, the receiver-tank according to the first aspect of the present invention can be integrally assembled to a heat exchanger having a condensing portion and a subcooling portion to form a heart exchanger with a receiver-tank such as a subcooling system condenser.

According to the fourth aspect of the present invention, a heat exchanger with a receiver-tank, comprises: a heat exchanger body including a pair of headers disposed in parallel at a certain distance, a plurality of heat exchanging tubes with both ends thereof connected to the pair of headers, partitioning members each partitioning an inside of the header to thereby group the plurality of heat exchanging tubes into a condensing portion and a subcooling portion, a condensing portion outlet for discharging refrigerant condensed while passing through the heat exchanging tubes and a subcooling portion inlet for introducing refrigerant into the subcooling portion; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant discharged from the condensing portion outlet into the receiver-tank inlet and introducing the refrigerant discharged from the receiver-tank outlet into the subcooling portion inlet, wherein a flow-resistance layer for reducing a flow velocity of refrigerant passing through the flow-resistance layer is provided in the receiver-tank such that an upper space is formed above the flow-resistance layer, and wherein a suction pipe provided in the tank main body, the suction pipe having an upper end opened toward the upper space and a lower end communicated with the refrigerant outlet, whereby refrigerant introduced into the tank main body via the receiver-tank inlet passes through the flow-resistance layer upward to cause liquid stagnation of liquefied refrigerant in the upper space, and the liquefied refrigerant flows out of the receiver-tank outlet via the suction pipe.

In the fourth aspect of the present invention, it is preferable that the flow-resistance layer is a desiccant-filled-layer constituted by numerous particle-shaped desiccating agents.

According to the fifth aspect of the present invention, a heat exchanger with a receiver-tank, comprising: a heat exchanger body including a pair of headers disposed in parallel at a certain distance, a plurality of heat exchanging tubes with both ends thereof connected to the pair of headers and a condensing portion outlet for discharging refrigerant condensed while passing through the heat exchanging tubes; a receiver-tank having a receiver-tank inlet and a receiver-tank outlet each formed in a bottom wall of the receiver-tank, the receiver-tank accumulating refrigerant introduced from the receiver-tank inlet and discharging only a liquefied refrigerant from the receiver-tank outlet; and a refrigerant passage for introducing the refrigerant flowed out of the condensing portion outlet into the receiver-tank inlet, wherein a flow-resistance layer for reducing a flow velocity of refrigerant passing through the flow-resistance layer is provided in the receiver-tank such that an upper space is formed above the flow-resistance layer, wherein a suction pipe is provided in the tank main body, the suction pipe having an upper end opened toward the upper space and a lower end communicated with the receiver-tank outlet, and wherein a desiccating-agent-filled member is disposed in the upper space so as to space apart from the flow-resistance layer, whereby refrigerant introduced into the tank main body via the receiver-tank inlet passes through the flow-resistance layer upward to cause liquid stagnation of liquefied refrigerant in the upper space, and the liquefied refrigerant flows out of the receiver-tank outlet via the suction pipe.

In the fifth aspect of the present invention, it is preferable that the flow-resistance layer is a desiccant-filled-layer constituted by numerous particle-shaped desiccating agents.

Furthermore, in the fifth aspect of the present invention, it is preferable that desiccating-agent-filled member is immovably or movably disposed in the upper space.

The receiver-tank according to the second aspect of the present invention can be integrally assembled to a heat exchanger having a condensing portion and a subcooling portion to form a heat exchanger with a receiver-tank such as a subcooling system condenser.

According to the sixth aspect of the present invention, a heat exchanger with a receiver-tank, comprising: a heat exchanger body including a pair of headers disposed in parallel at a certain distance, a plurality of heat exchanging tubes with both ends thereof connected to the pair of headers, partitioning members each partitioning an inside of the header to thereby group the plurality of heat exchanging tubes into a condensing portion and a subcooling portion, a condensing portion outlet for discharging refrigerant condensed while passing through the heat exchanging tubes and a subcooling portion inlet for introducing the refrigerant into the subcooling portion; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant discharged from the condensing portion outlet into the receiver-tank inlet and introducing the refrigerant discharged from the receiver-tank outlet into the subcooling portion inlet, wherein a flow-resistance layer for reducing a flow velocity of refrigerant passing through the flow-resistance layer is provided in the receiver-tank such that an upper space is formed above the flow-resistance layer, wherein a suction pipe is provided in the tank main body, the suction pipe having an upper end opened toward the upper space and a lower end communicated with the receiver-tank outlet, and wherein a desiccating-agent-filled member is disposed in the upper space so as to space apart from the flow-resistance layer, whereby refrigerant introduced into the tank main body via the receiver-tank inlet passes through the flow-resistance layer upward to cause liquid stagnation of liquefied refrigerant in the upper space, and the liquefied refrigerant flows out of the receiver-tank outlet via the suction pipe.

In the sixth aspect of the present invention, it is preferable that the flow-resistance layer is a desiccant-filled-layer constituted by numerous particle-shaped desiccating agents.

The receiver-tank according to the first aspect of the present invention can constitute a condensing apparatus for use in a refrigeration cycle together with a condenser such as a header-type condenser and a serpentine-type condenser.

According to a seventh aspect of the present invention, a condensing apparatus for use in a refrigeration cycle, the condensing apparatus comprises: a condenser including a condensing portion for condensing refrigerant and a condensing portion outlet for discharging the refrigerant condensed by the condensing portion; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant flowed out of the condensing portion outlet into the receiver-tank inlet, wherein a flow-resistance layer for reducing a flow velocity of refrigerant passing through the flow-resistance layer is provided in the receiver-tank such that an upper space is formed above the flow-resistance layer, and wherein a suction pipe is provided in the tank main body, the suction pipe having an upper end opened toward the upper space and a lower end communicated with the receiver-tank outlet, whereby refrigerant introduced into the tank main body via the receiver-tank inlet passes through the flow-resistance layer upward to cause liquid stagnation of liquefied refrigerant in the upper space, and the liquefied refrigerant flows out of the receiver-tank outlet via the suction pipe.

Furthermore, the receiver-tank according to the second aspect of the present invention can constitute a condensing apparatus for use in a refrigeration cycle together with a condenser such as a header-type condenser and a serpentine-type condenser.

According to the eighth aspect of the present invention, a condensing apparatus for use in a refrigeration cycle, said condensing apparatus comprising: a condenser including a condensing portion for condensing refrigerant and a condensing portion outlet for discharging the refrigerant condensed by said condensing portion; a receiver-tank having a receiver-tank inlet and a receiver-tank outlet each formed in a bottom wall of said receiver-tank, said receiver-tank accumulating refrigerant introduced from said receiver-tank inlet and discharging only liquefied refrigerant from said receiver-tank outlet; and a refrigerant passage for introducing the refrigerant flowed out of said condensing portion outlet into said receiver-tank inlet, wherein a flow-resistance layer for reducing a flow velocity of refrigerant passing through said flow-resistance layer is provided in said receiver-tank such that an upper space is formed above said flow-resistance layer, wherein a suction pipe is provided in said tank main body, said suction pipe having an upper end opened toward said upper space and a lower end communicated with said receiver-tank outlet, and wherein a desiccating-agent-filled member is disposed in said upper space so as to space apart from said flow-resistance layer, whereby refrigerant introduced into said tank main body via said receiver-tank inlet passes through said flow-resistance layer upward to cause liquid stagnation of liquefied refrigerant in said upper space, and the liquefied refrigerant flows out of said receiver-tank outlet via said suction pipe.

In the eighth aspect of the present invention, it is preferable that the flow-resistance layer is a desiccant-filled-layer constituted by particle-shaped desiccating agents.

According to the ninth aspect of the present invention, a receiver-tank for use in a refrigeration cycle, wherein condensed refrigerant is introduced into the receiver-tank and accumulated therein and only liquefied refrigerant flows out of the receiver-tank, the receiver-tank, comprises: a tank main body having a refrigerant inlet and a refrigerant outlet each provided in a bottom wall of the tank main body; a flow-resistance layer for reducing a flow velocity of refrigerant passing through the flow-resistance layer, the flow-resistance layer being provided in the tank main body such that an upper space is formed above the flow-resistance layer; a suction pipe provided in the tank main body, the suction pipe having an upper end opened toward the upper space and a lower end communicated with the refrigerant outlet, whereby refrigerant introduced into the tank main body via the refrigerant inlet passes through the flow-resistance layer upward to cause liquid stagnation of liquefied refrigerant in the upper space, and the liquefied refrigerant flows out of the refrigerant outlet via the suction pipe, and wherein the suction pipe is constituted by the refrigerant outlet.

With the receiver-tank for use in a refrigeration cycle according to the ninth aspect of the present invention, the same functions and effects as-those of the first aspect of the present invention can be obtained.

Furthermore, since the refrigerant outlet serves as the suction pipe, the number of parts can be reduced, resulting in a simplified structure and reduced manufacturing cost.

In the ninth aspect of the present invention, it is preferable that the flow-resistance layer is provided with a plurality of dispersing passages for dispersing the refrigerant in a radial and outward direction of the tank main body.

In the ninth aspect of the present invention, it is preferable that the flow-resistance layer is a filtering layer constituted by a fiber tangled member.

In the ninth aspect of the present invention, it is preferable that a dented portion is formed in a region of an upper surface of the bottom wall of the tank main body corresponding to the refrigerant inlet, and the flow-resistance layer is disposed in the dented portion.

In the ninth aspect of the present invention, it is preferable that a refrigerant permeable sheet constituted by a mesh sheet is disposed at a position of a bottom surface of the dented portion corresponding to the refrigeration inlet.

In the ninth aspect of the present invention, it is preferable that a pressing member for downwardly pressing the flow-resistance layer is provided in the tank main body, wherein refrigerant passage apertures are provided in a portion of the pressing member corresponding to the flow-resistance layer, and wherein an opening corresponding to the refrigerant outlet is provided in the pressing member.

In the ninth aspect of the present invention, it is preferable a refrigerant permeable member constituted by a mesh sheet is disposed in a refrigerant passage opening of the pressing member.

In the ninth aspect of the present invention, it is preferable that a desiccant-filled-layer is disposed in an upper space of the tank main body in a fixed manner.

In the ninth aspect of the present invention, it is preferable that a desiccant-filled-member is disposed freely in an upper space of the tank main body.

The aforementioned receiver-tank according to the ninth aspect of the present invention can constitute a heat exchanger with a receiver-tank by integrally assembling to a heat exchanger such as a condenser.

According to the tenth aspect of the present invention, a heat exchanger with a receiver-tank, comprises: a heat exchanger body including a pair of headers disposed in parallel at a certain distance, a plurality of heat exchanging tubes with both ends thereof connected to the pair of headers in fluid communication and a condensing portion outlet for discharging refrigerant condensed while passing through the heat exchanging tubes; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant flowed out of the condensing portion outlet into the receiver-tank inlet, wherein a flow-resistance layer for reducing a flow velocity of refrigerant passing through the flow-resistance layer is provided in the receiver-tank such that an upper space is formed above the flow-resistance layer, wherein a suction pipe is provided in the receiver-tank, the suction pipe having an upper end opened toward the upper space and a lower end communicated with the receiver-tank outlet, whereby refrigerant introduced into the receiver-tank via the receiver-tank inlet passes through the flow-resistance layer upward to cause liquid stagnation of liquefied refrigerant in the upper space, and the liquefied refrigerant flows out of the receiver-tank outlet via the suction pipe, and wherein the suction pipe is constituted by the refrigerant-tank outlet.

In the tenth aspect of the present invention, it is preferable that the flow-resistance layer is provided with a plurality of dispersing passages for dispersing the refrigerant in a radial and outward direction of the tank main body.

In the tenth aspect of the present invention, it is preferable that the flow-resistance layer is a filtering layer constituted by a fiber tangled member.

In the tenth aspect of the present invention, it is preferable that a dented portion is formed in a region of an upper surface of the bottom wall of the tank main body corresponding to the refrigerant inlet, and the flow-resistance layer is disposed in the dented portion.

In the tenth aspect of the present invention, it is preferable that a desiccant-filled-layer is disposed in an upper space of the tank main body in a fixed manner.

In the tenth aspect of the present invention, it is preferable that a desiccant-filled-member is disposed freely in an upper space of the tank main body.

The aforementioned receiver-tank according to the ninth aspect of the present invention can constitute a heat exchanger with a receiver-tank such as a subcooling system condenser by integrally assembling to a heat exchanger such as a condenser having a condensing portion and a subcooling portion.

According to the eleventh aspect of the present invention, a heat exchanger with a receiver-tank, comprises: a heat exchanger body including a pair of headers disposed in parallel at a certain distance, a plurality of heat exchanging tubes with both ends thereof connected to the pair of headers in fluid communication, partitioning members each partitioning an inside of the header to thereby group the plurality of heat exchanging tubes into a condensing portion and a subcooling portion, a condensing portion outlet for discharging refrigerant condensed while passing through the heat exchanging tubes and a subcooling portion inlet for introducing refrigerant into the subcooling portion; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant discharged from the condensing portion outlet into the receiver-tank inlet and introducing the refrigerant discharged from the receiver-tank outlet into the subcooling portion inlet, wherein a flow-resistance layer for reducing a flow velocity of refrigerant passing through the flow-resistance layer is provided in the receiver-tank such that an upper space is formed above the flow-resistance layer, wherein a suction pipe is provided in the receiver-tank, the suction pipe having an upper end opened toward the upper space and a lower end communicated with the receiver-tank outlet, whereby refrigerant introduced into the receiver-tank via the receiver-tank inlet passes through the flow-resistance layer upward to cause liquid stagnation of liquefied refrigerant in the upper space, and the liquefied refrigerant flows out of the receiver-tank outlet via the suction pipe, and wherein the suction pipe is constituted by the refrigerant-tank outlet.

In the eleventh aspect of the present invention, it is preferable that the flow-resistance layer is provided with a plurality of dispersing passages for dispersing the refrigerant in a radial and outward direction of the tank main body.

In the eleventh aspect of the present invention, it is preferable that the flow-resistance layer is a filtering layer constituted by a fiber tangled member.

In the eleventh aspect of the present invention, it is preferable that a dented portion is formed in a region of an upper surface of a bottom wall of the tank main body corresponding to the refrigerant inlet, and wherein the flow-resistance layer is disposed in the dented portion.

In the eleventh aspect of the present invention, it is preferable that a desiccant-filled-layer is disposed in an upper space of the tank main body in a fixed manner.

In the eleventh aspect of the present invention, it is preferable that a desiccant-filled-member is disposed freely in an upper space of the tank main body.

The aforementioned receiver-tank according to the ninth aspect of the present invention can constitute condensing apparatus for use in a refrigeration cycle together with a header type condenser or a serpentine type condenser.

According to the twelfth aspect of the present invention, a condensing apparatus for use in a refrigeration cycle, the condensing apparatus, comprises: a condenser including a condensing portion for condensing refrigerant and a condensing portion outlet for discharging the refrigerant condensed by the condensing portion; a receiver-tank having a receiver-tank inlet and a receiver-tank outlet each formed in a bottom wall of the receiver-tank, the receiver-tank accumulating refrigerant introduced from the receiver-tank inlet and discharging only liquefied refrigerant from the receiver-tank outlet; and a refrigerant passage for introducing the refrigerant flowed out of the condensing portion outlet into the receiver-tank inlet, wherein a flow-resistance layer for reducing a flow velocity of refrigerant passing through the flow-resistance layer is provided in the receiver-tank such that an upper space is formed above the flow-resistance layer, wherein a suction pipe is provided in the receiver-tank, the suction pipe having an upper end opened toward the upper space and a lower end communicated with the receiver-tank outlet, whereby refrigerant introduced into the receiver-tank via the receiver-tank inlet passes through the flow-resistance layer upward to cause liquid stagnation of liquefied refrigerant in the upper space, and the liquefied refrigerant flows out of the receiver-tank outlet via the suction pipe, and wherein the suction pipe is constituted by the refrigerant-tank outlet.

In the twelfth aspect of the present invention, it is preferable that the flow-resistance layer is provided with a plurality of dispersing passages for dispersing the refrigerant in a radial and outward direction of the tank main body.

In the twelfth aspect of the present invention, it is preferable that the flow-resistance layer is a filtering layer constituted by a fiber tangled member.

In the twelfth aspect of the present invention, it is preferable that a dented portion is formed in a region of an upper surface of the bottom wall of the tank main body corresponding to the refrigerant inlet, and wherein the flow-resistance layer is disposed in the dented portion.

In the twelfth aspect of the present invention, it is preferable that a desiccant-filled-layer is disposed in an upper space of the tank main body in a fixed manner.

In the twelfth aspect of the present invention, it is preferable that a desiccant-filled-member is disposed freely in an upper space of the tank main body.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings.

[First Embodiment]

Figure 1:
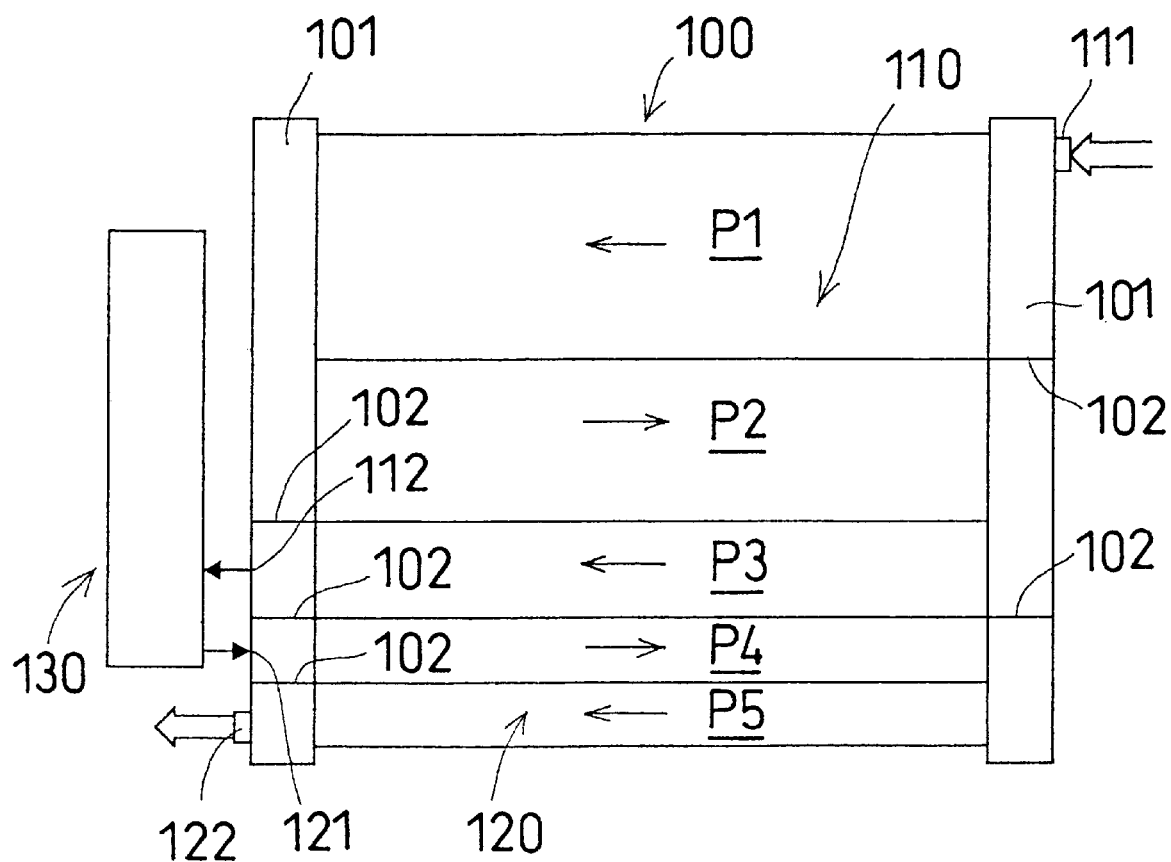
FIG. 1 is a schematic front view showing a heat exchanger with a receiver-tank according to a first embodiment of the present invention.

FIG. 1 is a schematic front view showing a heat exchanger (condenser) with a receiver-tank according to a first embodiment of the present invention. As shown in FIG. 1, this heat exchanger is comprised of the so-called multi-flow type heat exchanger body 100 and a receiver-tank 130.

The heat exchanger body 100 is provided with a pair of right and left vertical headers 101 and 101 spaced apart from each other. Between the pair of headers 101 and 101, a plurality of flat heat exchanging tubes are disposed horizontally at certain intervals in the up-and-down direction with both ends thereof communicated with the corresponding headers 101 and 101. In the predetermined portions of each header 101 and 101, partition members 102 are provided to thereby divide the heat exchanging tubes into a plurality of groups forming paths P1 to P5. Among these paths, the first path PI to the third path P3 constitute a condensing portion 110, and the fourth and fifth paths P4 and P5 constitute a subcooling portion 120 which is independent from the condensing portion 110.

At the upper portion of the right-hand header 101 and the lower portion of the left-hand header 101 corresponding to the condensing portion 110, a condensing portion inlet 111 and a condensing portion outlet 112 are provided, respectively. Furthermore, at the upper and lower end portions of the left-hand header 101 corresponding to the subcooling portion 120, a subcooling portion inlet 121 and a subcooling portion outlet 122 are provided, respectively.

Figure 2:
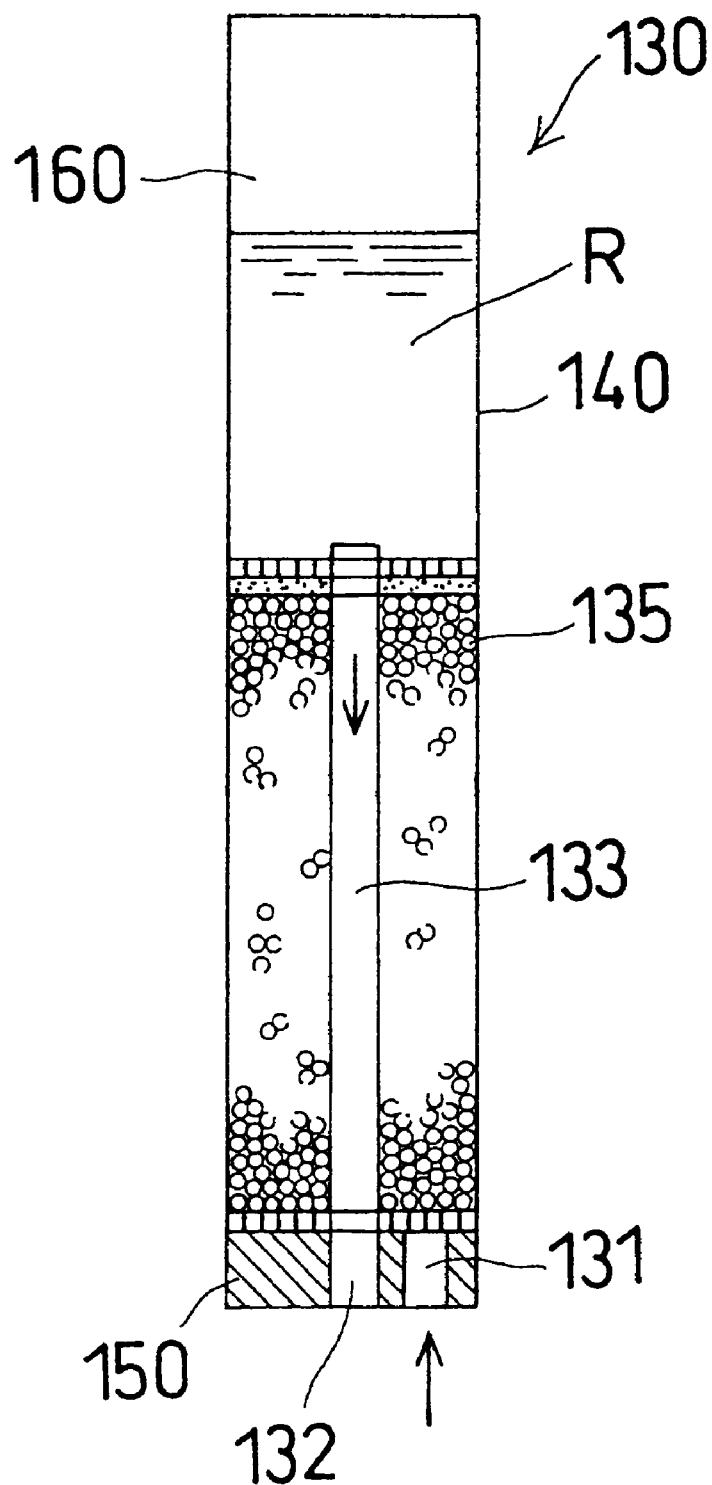
FIG. 2 is a schematic vertical front cross-sectional view showing the receiver-tank of the first embodiment.
Figure 3:
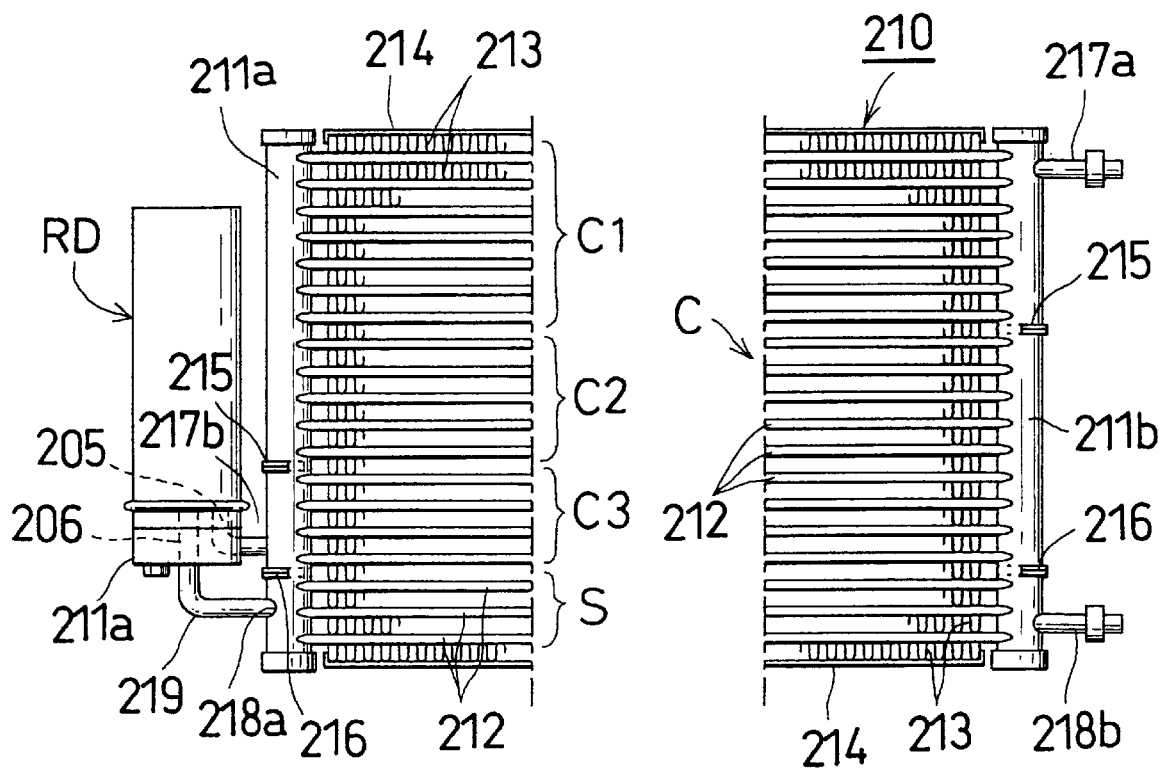
FIG. 3 is a front view showing a heat exchanger with a receiver-tank according to a second embodiment of the present invention.

As shown in FIG. 2, a receiver-tank 130 is comprised of a vertically disposed cylindrical-type tank main body 140 and an inlet-and-outlet forming member 150 constituting a bottom wall of the tank main body 140.

The inlet-and-outlet forming member 150 is provided with a receiver-tank inlet 131 and a receiver-tank outlet 132.

In the lower-half portion of the tank main body 140, desiccants each having a spherical particle shape, such as molecular sieves, are filled to form a desiccant-filled-layer 135 such that an upper space 160 is formed above the desiccant-filled-layer 135 in the tank main body 140.

Furthermore, in the tank main body 140, a refrigerant suction pipe 133 is arranged along the axis of the tank main body 140 such that the lower end thereof is connected to the receiver-tank outlet 132 and the upper end thereof is opened to the bottom portion of the upper space 160, i.e., a portion near the upper surface of the desiccant-filled-layer 135 in the upper space 160.

The receiver-tank inlet 131 and the receiver-tank outlet 132 of this receiver-tank 130 are to be connected to the condensing portion outlet 112 and the subcooling portion inlet 121 of the heat exchanger body 100, respectively.

This heat exchanger with the receiver-tank is used as a condenser for an automobile air-conditioning refrigeration system together with a compressor, a decompressing means such as an expansion valve and an evaporator in the same manner as in the aforementioned conventional system. In this refrigeration cycle, the gaseous refrigerant of high temperature and high pressure compressed by the compressor flows into the condensing portion 110 via the condensing portion inlet 111 of the heat exchanger body 100.

The gaseous refrigerant flowed into the condensing portion 110 via the condensing portion inlet 111 exchanges heat with the ambient air to be condensed while passing through each path P1 to P3 of the condensing portion 110 in this order. The condensed refrigerant as a mixture of gaseous refrigerant and liquefied refrigerant is led into the receiver-tank 130 via the condensing portion outlet 112.

The refrigerant as a mixture of gaseous refrigerant and liquefied refrigerant flowed into the receiver-tank 130 is rapidly spread at the bottom portion of the tank main body 140, reducing the flow velocity, and goes upward through the desiccant-filled-layer 135. Thus, the desiccant-filled-layer 135 functions as a flow resistance layer for reducing the upward flow velocity of the refrigerant. Accordingly, liquefied refrigerant whose flow velocity is slower than that of gaseous refrigerant passes through the desiccant-filled-layer 135 at a lower speed. When the liquefied refrigerant reaches the upper space 160, the flow velocity is fully reduced. Therefore, liquid-stagnation R will be created without causing any disturbance in the upper space 160.

On the other hand, when the gaseous refrigerant goes up through the desiccant-filled-layer 135, the flow velocity is reduced rapidly. Therefore, when the gaseous refrigerant reaches the aforementioned liquid-stagnation R formed in the upper space 160, the gaseous refrigerant goes up quietly as bubbles in the accumulated liquefied refrigerant, and extinguishes at the surface of the accumulated liquefied refrigerant without causing any disturbance of the liquid surface. Thus, the gaseous refrigerant will be stored above the liquid surface in the upper space.

As mentioned above, the stable liquid-stagnation R is formed above the desiccant-filled-layer 135 as mentioned above, and that the inlet side end of the refrigerant suction pipe 133 is opened toward the bottom of the liquid-stagnation R. Accordingly, only the liquefied refrigerant forming the stabilized liquid-stagnation R flows out through the receiver-tank outlet 132, and then flows into the subcooling zone 120 of the heat exchanger body 100.

The liquefied refrigerant flowed into the subcooling portion 120 passes through the fourth and fifth passes P4 and P5 while exchanging heat with the ambient air to be subcooled. Thereafter, the subcooled refrigerant flows out of the subcooling portion through the subcooling portion outlet 122, and then is introduced into a decompressing means, an evaporator and a compressor in this order. Thus, the refrigerant circulates in the refrigeration cycle.

As mentioned above, in the heat exchanger with the receiver-tank according to this embodiment, since the condensed refrigerant introduced in the receiver-tank 130 forms the liquid-stagnation R quietly and slowly and the bubbles of the gaseous refrigerant extinguishes smoothly and efficiently, the stable range of the amount of sealed refrigerant can be expanded. This enables only the stable liquefied refrigerant to be extracted assuredly. Accordingly, since the stable supply of the liquefied refrigerant into the subcooling portion 120 can be performed, the subcooling function of the subcooling portion 120 can be attained to the maximum extent, resulting in sufficient subcooling. As a result, the refrigeration cycle can be operated stably, resulting in enhanced refrigeration performance.

Furthermore, since liquefied refrigerant can be supplied stably, the receiver-tank 130 can be decreased in diameter and enhanced in performance. As a result, the entire refrigerant system can be decreased in size and weight, which in turn can reduce the amount of refrigerant.

In the aforementioned embodiment, although the flow-resistance layer is constituted by the desiccant-filled-layer 135, the present invention is not limited to it. For example, the flow-resistance layer may be formed by numerous particles, knitted fabrics, woven fabrics, non-woven fabrics, a porous or perforated panel/member or the lamination thereof, or a combination of one or more of the aforementioned members/materials. In the following embodiments and its modifications, the aforementioned various member/materials can also be used as a flow-resistance layer.

[Second Embodiment]

FIGS. 3 to 6 show a heat exchanger with a receiver-tank according to a second embodiment of the present invention.

As shown in these figures, this heat exchanger with a receiver-tank is equipped with a heat exchanger body 210 and a receiver-tank RD.

The heat exchanger body 210 is a subcool system condenser in which a condensing portion C and a subcooling portion S are integrally provided. This heat exchanger 210 is provided with a pair of right and left vertical headers 211b and 211a spaced apart from each other and a plurality of flat heat exchanging tubes 212 disposed horizontally between the headers 211a and 211b at certain intervals with both ends thereof being communicated with the corresponding headers 211a and 211b. A corrugated fin 213 is arranged on the outside of each outermost heat exchanging tube 212. Between the adjacent heat exchanging tubes 212 and 212, corrugated fins 213 are arranged. A side plate 214 for protecting the corrugated fin 213 is arranged on the outside of each outermost heat exchanging tube 212.

In the lower portion of each header 211a and 211b, partition members 216 each for dividing the inside of the header are provided at the same height. The upper side of the condenser 210 above the partition members 216 and 216 and the lower side thereof below the partition members 216 and 216 constitute a condensing portion C and a subcooling portion S, respectively. In the condensing portion C, the aforementioned plurality of tubular elements 212 are divided into the first path C1 to the third path C3 by partition members 215 and 215 provided in the headers 211a and 211b at predetermined positions.

Furthermore, at the upper and lower end portions of the right-hand header 211b, a condensing portion inlet 217a and a subcooling portion outlet 218b are provided, respectively. At the lower end portion of the left-hand header 211a corresponding to the condensing portion C and the lower end portion of the left-hand header 211a corresponding to the subcooling portion S, a condensing portion outlet 217b and a subcooling portion inlet 218a are provided, respectively.

The receiver-tank RD has a vertically disposed cylindrical tank main body 201 in which a desiccant-filled-layer 202 as a flow resistance layer is provided. In the tank main body 201, an upper space 203 is formed above the desiccant-filled-layer 202 and a lower space 204 is formed below the desiccant-filled-layer 202. At the position apart from the center of an inlet-and-outlet forming member 201a as a bottom wall of the tank main body 201, a receiver-tank inlet 205 having an outlet opening 205a opened toward the lower space 204 is formed.

Furthermore, a receiver-tank outlet 206b is penetrated in the center of the inlet-and-outlet forming member 201a along the axial direction thereof. A suction pipe 260 is disposed in the tank main body 201 along the central axis thereof with the lower end connected to the receiver-tank outlet 206b. Thus, in this embodiment, the receiver-tank outlet 206b and the suction pipe 260 constitute the refrigerant-discharging-passage 206.

The refrigerant-discharging-passage 206 has an inlet side end portion 206a which opens toward the upper space 203 at the upper end central portion of the desiccant-filled-layer 202. The refrigerant-discharging-passage 206 extends along the central axis of the tank main body 201 and penetrates the central portion of the inlet-and-outlet forming member 201a to be communicated with the exterior of the tank main body 201. The inlet side end portion 206a has an enlarged-diameter-portion 261 in the shape of a bell which opens toward the upper space 203. Moreover, the desiccant-filled-layer 202 includes upper and lower porous plates 221a and 221b and spherical desiccant particles 202a filled between these plates 221a and 221b. Between the upper porous plate 221a and the top of the filled spherical desiccant particles 202a, a filter 207 made of fine porous materials is disposed.

The inlet side end portion 205b of the inlet 205 of the receiver-tank RD is connected to the condensing portion outlet 217b of the subcooling system condenser 210. Moreover, the receiver-tank outlet 206b is communicated with the subcooling portion inlet 218a via an L-shaped pipe 219.

Figure 4:
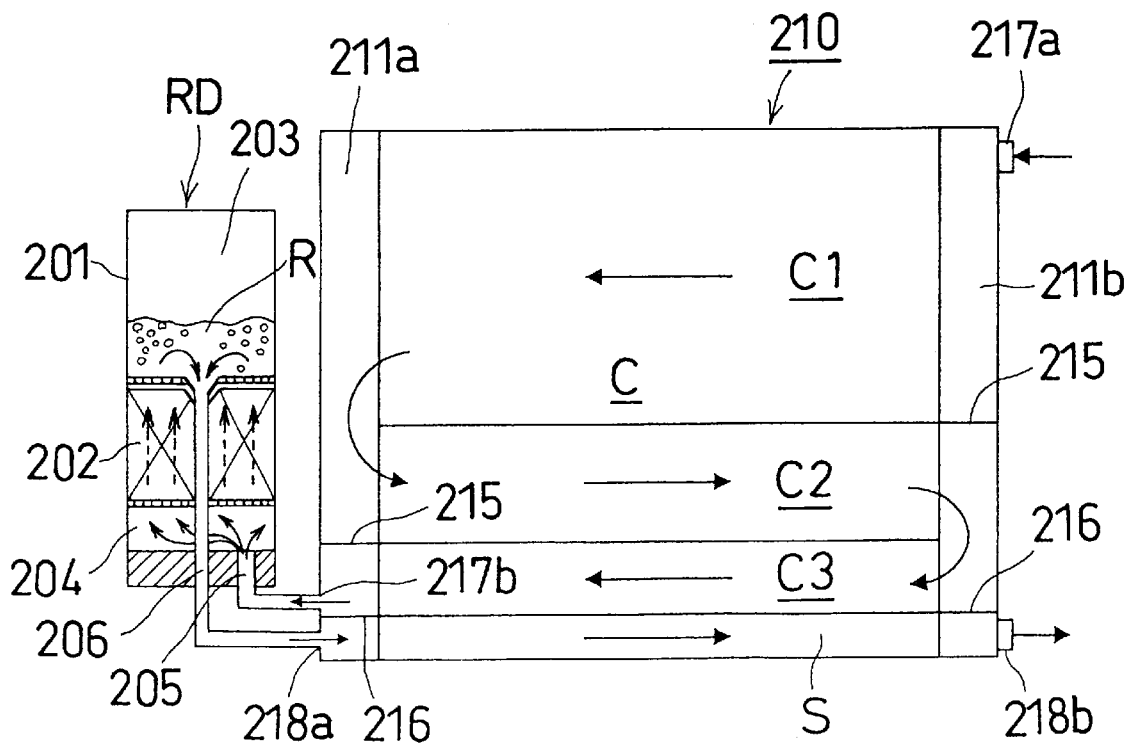
FIG. 4 is a schematic front cross-sectional view showing a refrigerant flow in the heat exchanger of the second embodiment.
Figure 5:
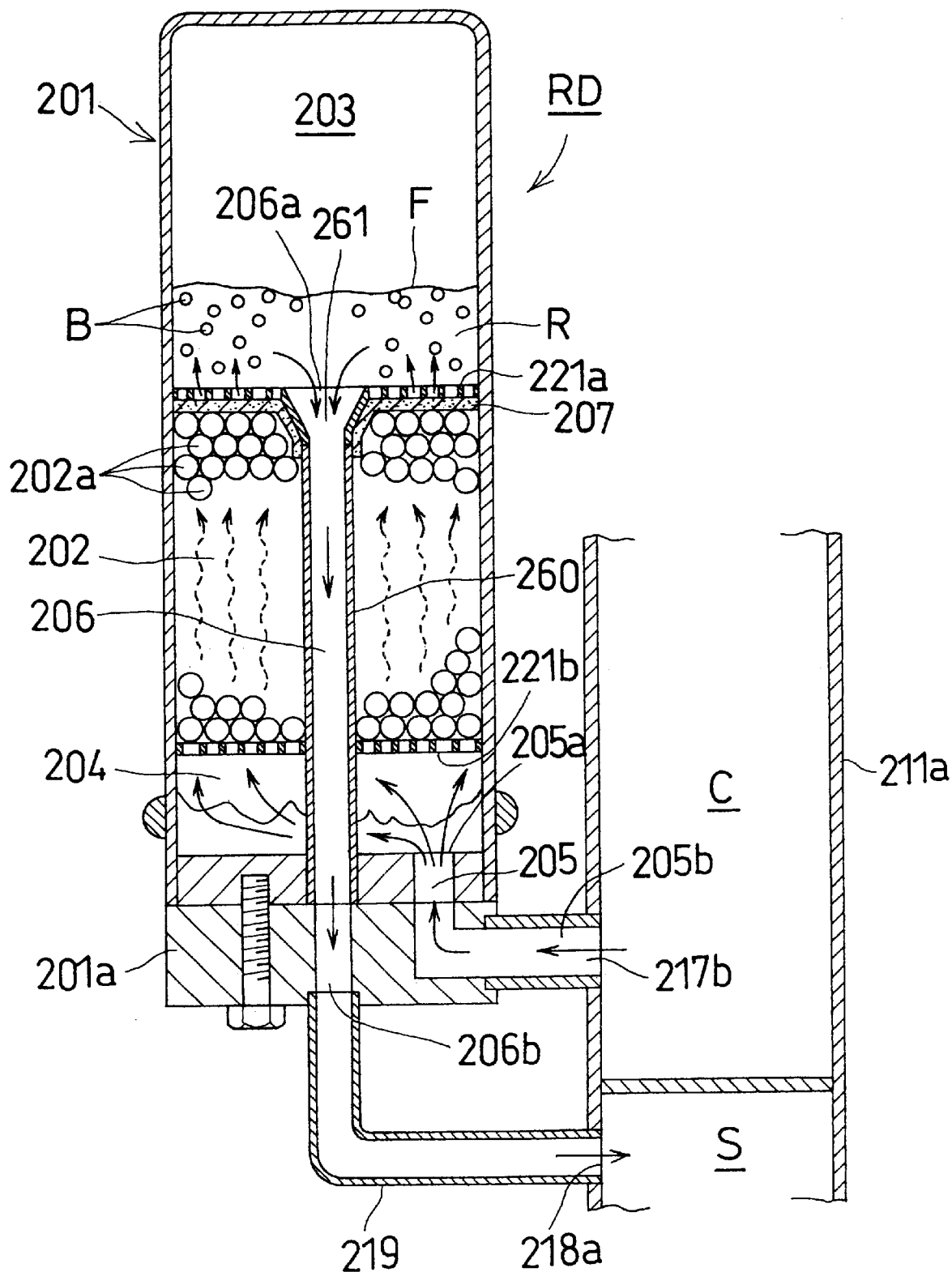
FIG. 5 is an enlarged cross-sectional view showing the receiver-tank of the second embodiment.
Figure 6:
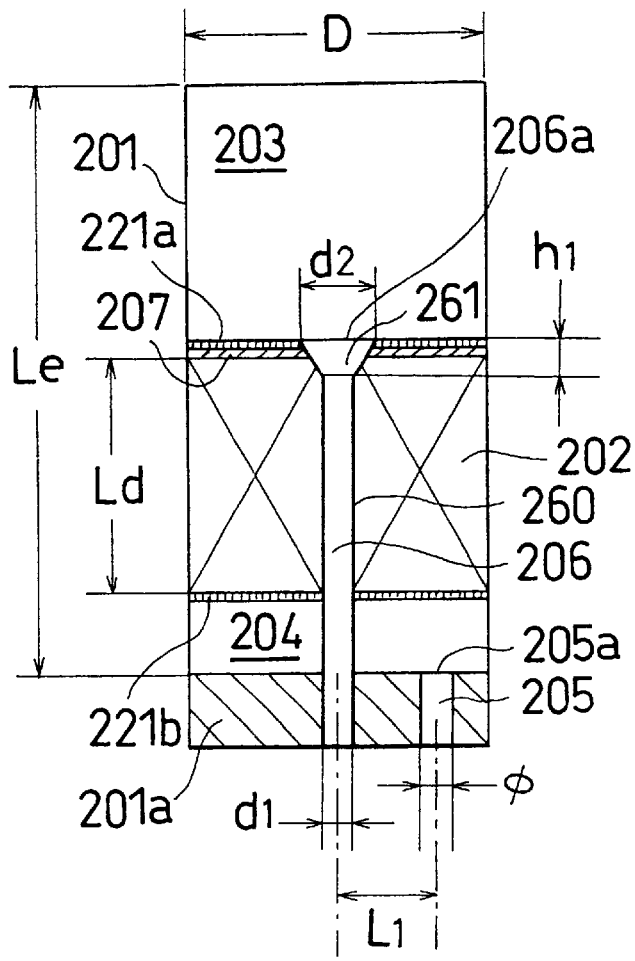
FIG. 6 is a schematic cross-sectional view showing the receiver-tank of the second embodiment.

In the above-mentioned heat exchanger with a receiver-tank, as shown in FIG. 4, the gaseous refrigerant of high temperature and high pressure from the compressor CP of the refrigeration cycle is introduced into the condensing portion C via the condensing portion inlet 217a of the heat exchanger main body 210. The gaseous refrigerant passes through the first path C1 to the third path C3 in turn. While passing through these paths C1 to C3, the gaseous refrigerant exchanges heat with the ambient air to be condensed, and flows into the receiver-tank RD via the condensing portion outlet 217b as a mixture of gaseous refrigerant and liquefied refrigerant.

The refrigerant, which is a mixture of gaseous refrigerant and liquefied refrigerant, is separated into the gaseous refrigerant and the liquefied refrigerant in the receiver-tank RD. Then, the liquefied refrigerant passes through the refrigerant-discharging-passage 206 and flows into the subcooling portion S via the subcooling portion inlet 218a. In the subcooling portion S, the liquefied refrigerant further exchanges heat with the ambient air to be subcooled. The subcooled refrigerant is then sent to the following cycle part (evaporator side) via the subcooling portion outlet 218b.

In the meantime, the refrigerant, which is a mixture of gaseous refrigerant and liquefied refrigerant sent from the condensing portion C of the heat exchanger body 210, is sent into the receiver-tank RD at a high flow velocity. However, when the refrigerant flows into the lower space 204 through the receiver-tank inlet 205, it diffuses widely, resulting in a decreased flow velocity.

Furthermore, since the desiccant-filled-layer 202 functions as a resistance layer to the refrigeration flow going up through the desiccant-filled-layer 202, the upstream flow velocity is reduced remarkably and the refrigerant slowly flows into the upper space 203. Especially, in this embodiment, the refrigerant passing through between the spherical particles 202a of the desiccant-filled-layer 202 changes its direction frequently to take a long course. Therefore, the flow velocity reduces remarkably and a local high velocity flow also disappears due to the rectification function, resulting in a uniform upstream flow. Moreover, when passing through the filter 207, the liquefied refrigerant and the gaseous refrigerant will be dispersed finely.

Therefore, the liquefied refrigerant, which is slow in flow velocity as compared with gaseous refrigerant, passes through the desiccant-filled-layer 202 to reach the upper space 203, which results in a further reduced flow velocity. Accordingly, the liquefied refrigerant accumulates in the upper space 203 to form liquid-stagnation R without causing turbulence. On the other hand, the flow velocity of the gaseous refrigerant is also abruptly reduced when the gaseous refrigerant passes through the desiccant-filled-layer 202.

Accordingly, when the gaseous refrigerant reaches the liquid-stagnation R accumulated in the upper space 203, it calmly goes up in the liquid-stagnation R as bubbles B. Consequently, the gaseous refrigerant goes up to the surface of the liquid-stagnation R and accumulates above the surface thereof without disturbing the surface. As a result, the surface F of the liquid-stagnation R stabilizes with little fluctuation.

On the other hand, since the inlet side end portion 206a of the refrigerant-discharging-passage 206 is located at the bottom of the liquid-stagnation R stably accumulated in the upper space 203, only the liquefied refrigerant of the liquid-stagnation R flows into the refrigerant-discharging-passage 206 via the inlet side end portion 206a thereof, and is thus stably supplied to the subcooling portion S.

In this case, since the enlarged-diameter-portion 261 formed at the inlet side end portion 206a of the refrigerant-discharging-passage 206 serves as a dented portion at the upper end of the desiccant-filled-layer 202, the liquefied refrigerant easily flows into the refrigerant-discharging-passage 206.

Furthermore, since the flow velocity at the enlarged-diameter-portion 261 is slower than that at the inner side of the non-enlarged-diameter portion of the refrigerant-discharging-passage 206, even if bubbles B of the gaseous refrigerant appears near the inlet side end portion 206a, the bubbles B easily goes upward in the enlarged-diameter-portion 261. Therefore, very few bubbles B can be involved in the liquefied refrigerant flowing into the refrigerant-discharging-passage 206.

Therefore, in the subcooling portion S, the subcooling function can be demonstrated to the maximum extent, which can secure a sufficient subcooling area. In the refrigeration cycle including such a condensing apparatus employing the aforementioned receiver-tank RD, it is possible to fill an appropriate amount of the refrigerant at an earlier stage.

Moreover, since the steady region between the optimum point and the excessive point of refrigerant amount can be expanded by using the surplus space in the tank main body 201 as a buffer space, the stable operation of the whole refrigeration cycle can be performed. Furthermore, since the operation pressure can be kept low, the required power can be reduced, resulting in an improved system coefficient.

Figure 8:
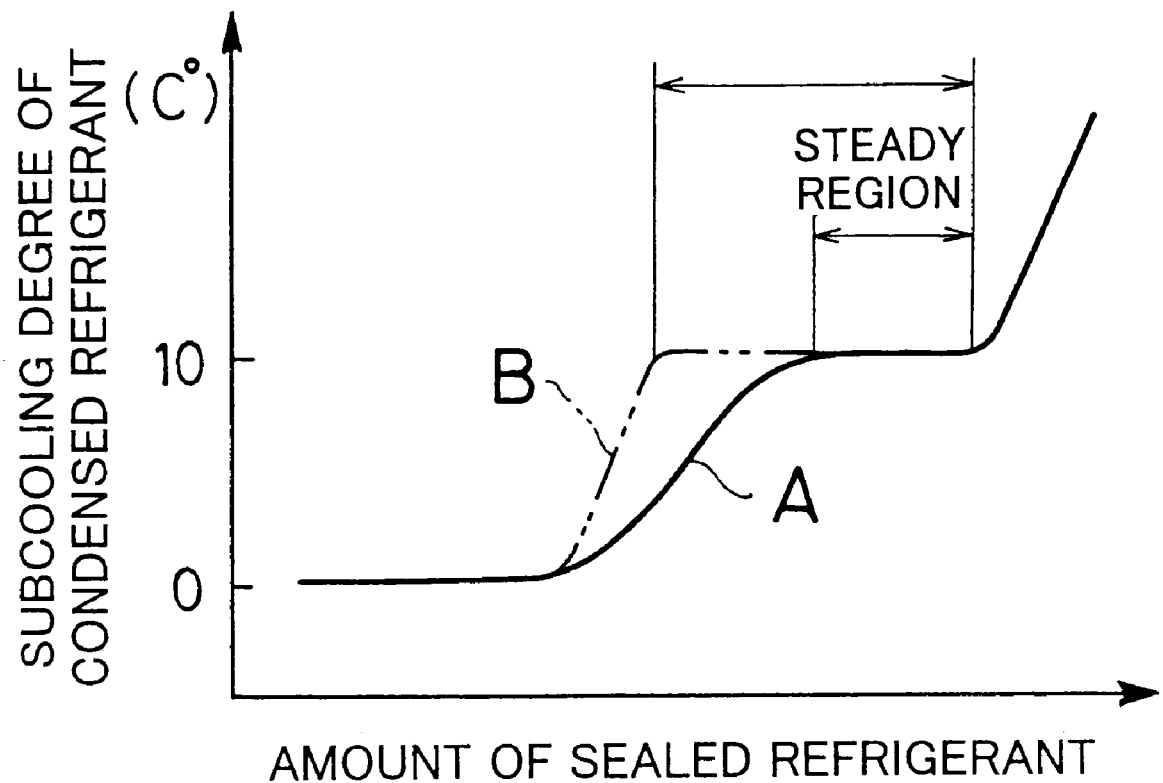
FIG. 8 is a graph showing the correlation between a subcooling degree of a condensed refrigerant and an amount of sealed refrigerant.

The above-mentioned action can be explained by using the correlation characteristic between the subcooling degree of the condensed refrigerant and the amount of sealed refrigerant obtained by the charge examination shown in FIG. 8 as follows. The subcooling degree goes up sharply and reaches the steady region start point at the fewer sealed refrigerant side, and the width of steady region becomes wider. In other words, it means that the curve Y approaches the ideal curve X2 shown by the phantom line in FIG. 8.

Therefore, in the automobile air conditioner using this heat exchanger, the miniaturization of the heat exchanger by decreasing the sealed refrigerant amount can be easily attained, the performance stability to load fluctuations can be improved and the performance deterioration with time due to a continuous running can also be prevented effectively.

Moreover, since the structure of the refrigerant-discharging-passage 206 and the receiver-tank inlet 205 of the receiver-tank RD differ slightly as compared to those of a heat exchanger in a conventional refrigeration cycle, an existing condenser including a subcooling portion can be used as it is. As for the receiver-tank RD, it is not required to drastically change the fundamental structure of a conventional receiver-tank. Furthermore, since the desiccant-filled-layer 202 itself demonstrates a rectification function, a special rectification means such as a rectification board can be omitted, which is advantageous in manufacturing cost.

Figure 7A:
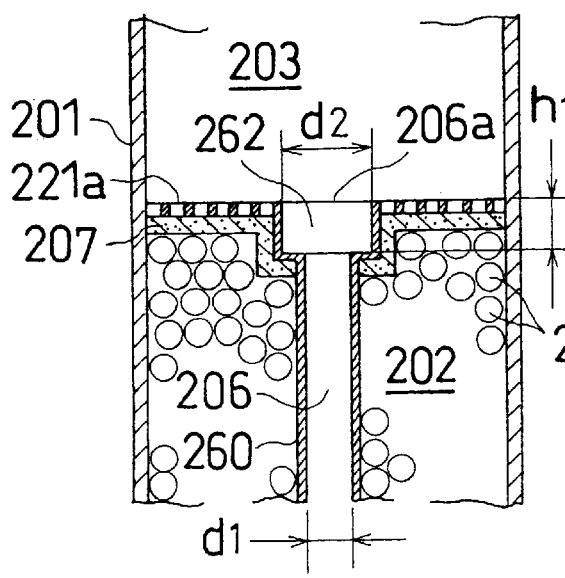
FIG. 7A is a cross-sectional view showing the central portion of the receiver-tank according to a first modification of the second embodiment.

In addition, the refrigerant-discharging-passage 206 of the receiver-tank RD in the aforementioned embodiment has an enlarged-diameter-portion 261 which upwardly opens in the shape of a bell. However, as shown in FIG. 7A, the enlarged-diameter-portion 262 may be discontinuously enlarged to the inner side (non-enlarged-diameter-portion) of the refrigerant-discharging-passage 206.

In order to effectively obtain the functions caused by the enlarged-diameter-portion 261 or 262 of the refrigerant-introducing-passage 206, it is recommended to satisfy the following conditions: $d1<d2\leq 3d1$, and $d1<h1\leq 5d1$, wherein the inner diameter of the non-enlarged-diameter-portion of the inlet of the refrigerant-discharging-passage 206, the maximum opening diameter of the enlarged-diameter-portion 261 or 262 and the depth of the enlarged-diameter-portion 261 or 262 are defined by d1, d2 and h1, respectively.

Moreover, it is preferable that the depth h1 of the enlarged-diameter-portion 261 or 262 is not larger than the longitudinal length Ld of the desiccant-filled-layer 202, i.e., it is preferable to satisfy the following condition: $h1\leq Ld$.

Figure 7B:
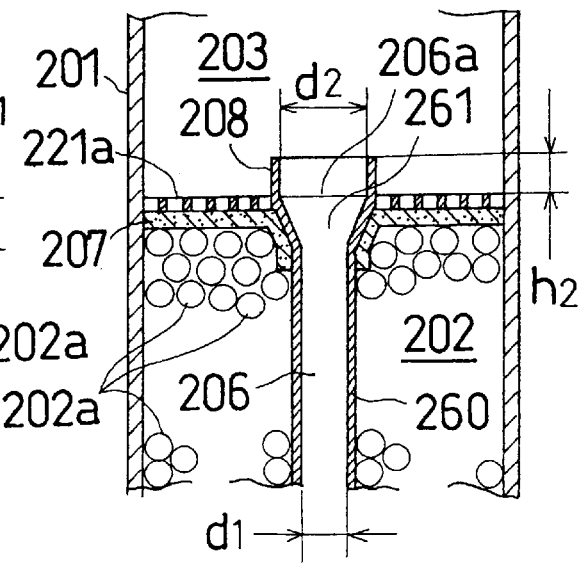
FIG. 7B is a cross-sectional view showing the central portion of the receiver-tank according to a second modification of the second embodiment.

FIG. 7B shows a further modification of a receiver-tank RD.

In this receiver-tank RD, a bubble-swallow-prevention wall 208 of a cylindrical shape is formed at the opening peripheral edge of the enlarged inlet side end portion 206a of the refrigerant-discharging-passage 206. Therefore, the bubbles B of the gaseous refrigerant going up through the liquid-stagnation R in the upper space 203 is hardly involved into the liquid-stagnation R flowing toward the inlet side end portion 206a, resulting in a decrease amount of gaseous refrigerant flowed into the refrigerant-discharging-passage 206.

In order to effectively obtain the function of the bubble-swallow-prevention wall 208 without causing any interruption of the liquefied refrigerant flow into the refrigerant-discharging-passage 206, it is preferable that the following condition is satisfied: $h2\leq 2d1$, wherein the inner diameter of the refrigerant-discharging-passage 206 and the height of the bubble-swallow-prevention wall 208 are defined by d1 and h2, respectively.

Furthermore, in the receiver-tank RD according to the present invention, the size and arrangement of each part can be set arbitrarily. However, it is preferable that the following conditions are satisfied: $1.5\phi\leq L1\leq 0.8D$, wherein the distance between the center of the refrigerant-introducing-passage 205 and the center of the refrigerant-discharging-passage 206, the inner diameter of the tank main body 201 and the opening diameter of the outlet side of the receiver-tank inlet 205 are defined by L1, D and $\phi$, respectively (see FIG. 6).

In this case, since the opening center of the receiver-tank inlet 205 and the outlet center of the refrigerant-discharging-passage 206 are moderately apart from each other, the upstream flow of the refrigerant introduced from the receiver-tank inlet 5 will not be concentrated on the inlet side end portion 206a side of the refrigerant-discharging-passage 206, which further reduces the refrigerant flow velocity and further stabilizes the refrigerant surface.

On the other hand, it is not recommended that the above-mentioned distance L1 is too short, and/or the receiver-tank inlet 205 has a cylindrical shape surrounding the refrigerant-discharging-passage 206 because the upstream flow through the receiver-tank inlet 205 will concentrate on the inlet end portion 206a side of the refrigerant-discharging-passage 206 and thereby a decrease of the refrigerant flow velocity near the refrigerant-discharging-passage 206 may become inadequate and a stable liquid surface of the liquid-stagnation R in the upper space 203 cannot be obtained.

In the above-mentioned embodiment, the lower space 204 is formed underneath the desiccant-filled-layer 202 in the tank main body 201. Instead, the desiccant-filled-layer 202 may be disposed on the inner bottom of the tank main body 201 without forming the aforementioned lower space 204 so that the refrigerant from the receiver-tank inlet 205 flows directly into the desiccant-filled-portion 202.

However, if the lower space 204 exists, there is an advantage such that the diffusion of refrigerant flowed from the receiver-tank inlet 205 can be made smoothly and the refrigerant-flow-velocity-decrease-functions due to the aforementioned diffusion becomes effective. If the height of the lower space 204 is set to 25% or less of the vertical length of the desiccant-filled-layer 202, a turbulent flow region will not be produced. Furthermore, since there is no room to generate a large amount of liquid-stagnation, a supply of the liquefied refrigerant to the upper space 203 can be fully secured. Moreover, the lower space 204 may be filled up with a resistance object which permits a flow of liquefied refrigerant and gaseous refrigerant.

In order to obtain a sufficient space for accumulating liquefied refrigerant and gaseous refrigerant in the upper space 203 of the tank main portion 201, it is desirable that the following condition is satisfied: $Ld\leq 0.7Le$, wherein the vertical length of the desiccant-filled-portion 202 and the effective vertical length of the tank main body 201 are defined by Ld and Le, respectively.

In addition, in a case where the receiver-tank RD is used in an inclined state, the inlet end portion 206a of the refrigerant-discharging-passage 206 is set to be located below the center of the inclined tank main body 201.

Although the heat exchanger according to the present invention can be suitably applied especially for a refrigeration cycle having a subcooling portion in addition to a condensing portion as in the aforementioned embodiment, it is also applicable to various refrigeration cycles with no subcooling portion. Moreover, the subcooling portion may be included in a refrigeration cycle as an independent heat exchanger instead of being integrally provided to the condenser like the subcooling system condenser of the aforementioned embodiment. Furthermore, the condenser may be the so-called parallel flow type heat exchanger as illustrated in FIG. 1, or the so-called serpentine type heat exchanger having a meandering heat exchanging tube.

[Third Embodiment]

Figure 9:
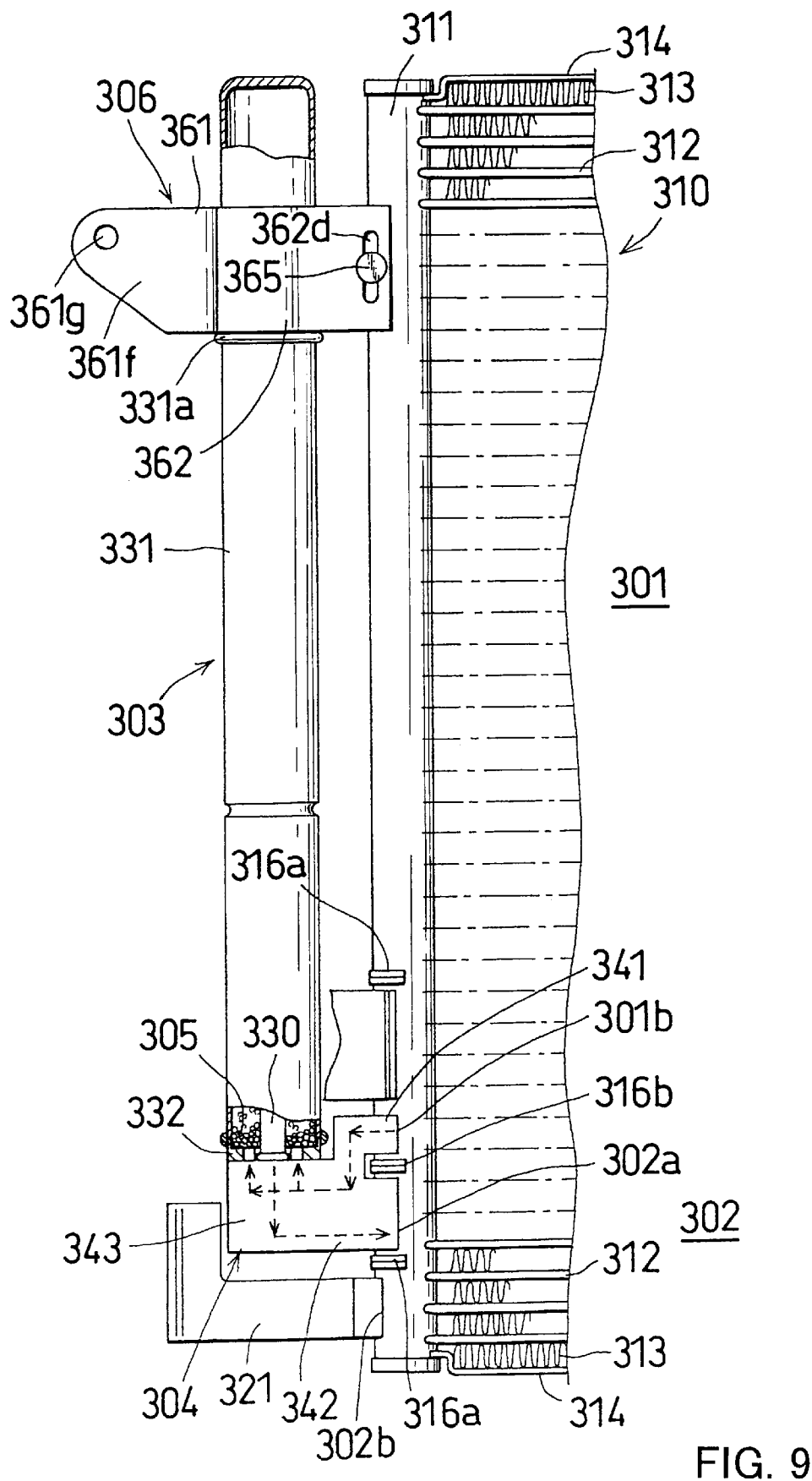
FIG. 9 is a front view showing the side portion of the heat exchanger with a receiver-tank according to a third embodiment of the present invention.
Figure 10:
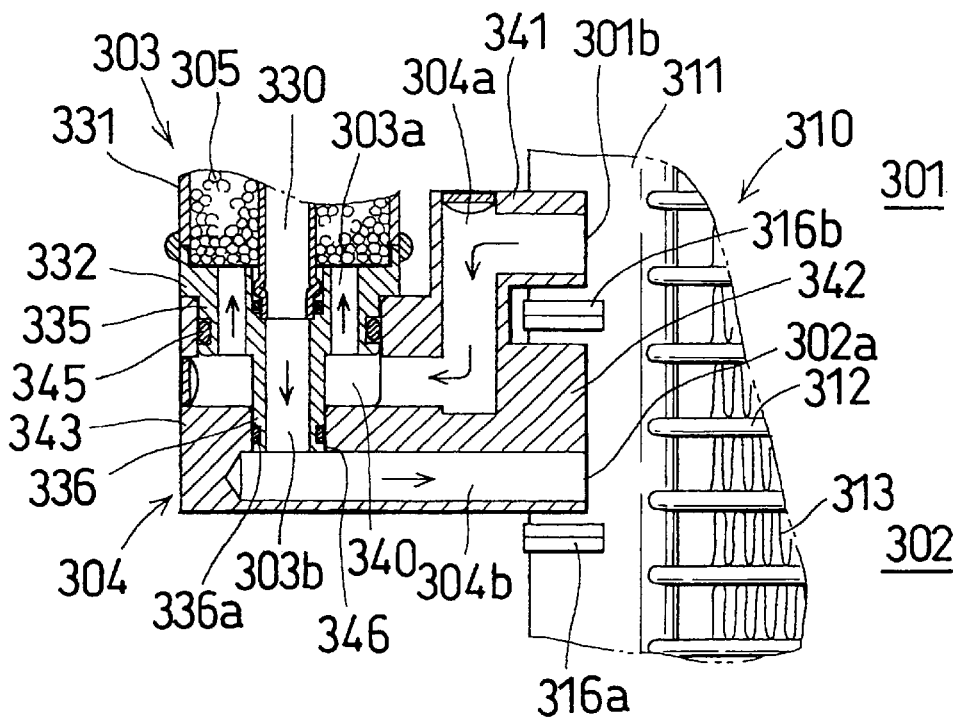
FIG. 10 is an enlarged front cross-sectional view showing the heat exchanger with a receiver-tank of the third embodiment.
Figure 11:
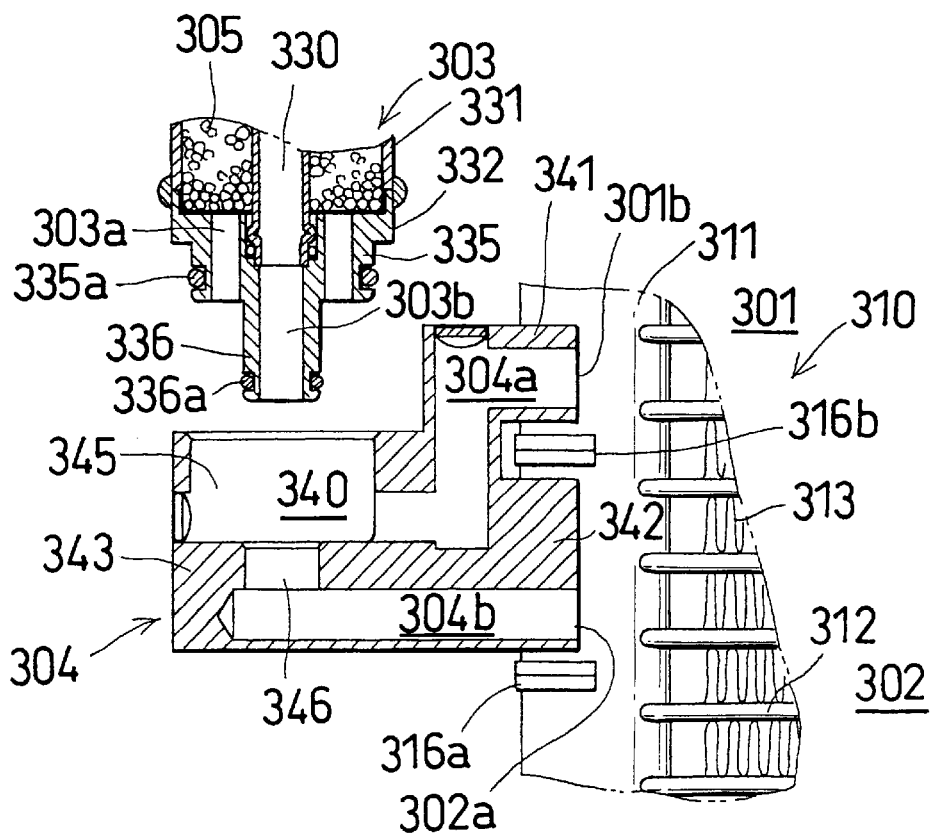
FIG. 11 is an enlarged front cross-sectional view showing the block flange and therearound of the heat exchanger according to the third embodiment in a disconnected state.

FIG. 9 is a front view showing one side portion of a heat exchanger with a receiver-tank according to the third embodiment of the present invention. FIG. 10 is an enlarged cross-sectional view showing a block flange and therearound of the heat exchanger. FIG. 11 is an exploded enlarged cross-sectional view showing a block flange and therearound of the heat exchanger.

As shown in these figures, this heat exchanger is provided with the so-called multi-flow type heat exchanger body 310, a receiver-tank 303 and a block flange 304 for connecting the receiver-tank 303 to the heat exchanger body 310.

This heat exchanger 310 is provided with a pair of right and left vertical headers 311 and 311 spaced apart from each other and a plurality of flat heat exchanging tubes 312 disposed horizontally between the headers 311 and 311 at certain intervals with both ends of thereof communicated with the corresponding headers 311 and 311. A corrugated fin 313 is arranged on the outside of each outermost heat exchanging tube 312. Between the adjacent heat exchanging tubes 312 and 312, corrugated fins 313 are arranged. A side plate 314 for protecting the corrugated fin 313 is arranged on the outside of each outermost heat exchanging tube 312.

In the lower portion of each header 311 and 311, partition members 316b each for dividing the inside of the header are provided at the same height. The upper side of the heat exchanger body 310 above the partition members 316b and 316b and the lower side thereof below the partition members 316b and 316b constitute a condensing portion C and a subcooling portion S, respectively.

In the condensing portion C, the aforementioned plurality of tubular elements 312 are divided into the first path C1 to the third path C3 by partition members 316a and 316a provided in the headers 311 and 311 at predetermined positions. In the subcooling portion S, the aforementioned plurality of tubular elements 312 are divided into the fourth path C4 to the fifth path C5 by partition members 316a and 316a provided in the headers 311 and 311 at predetermined positions in the same manner as in the first embodiment.

Furthermore, at the upper and lower end portions of the headers 311 and 311 corresponding to the condensing portion C, a condensing portion inlet (not shown) and a condensing portion outlet 301b are provided, respectively. At the lower end portion of the left-hand header 311 corresponding to the subcooling portion S, a subcooling portion inlet 302a and a subcooling portion outlet 302b are provided, respectively.

The gaseous refrigerant introduced into the condensing portion inlet (not shown) of the heat exchanger body 310 passes through the condensing portion 301 in a meandering manner while exchanging heat with the ambient air to be condensed, and flows out of the condensing portion outlet 301b of the left-hand header 311.

The liquefied refrigerant introduced from the subcooling portion inlet 302a passes through the subcooling portion 302 in a meandering manner while exchanging heat with the ambient air to be subcooled, and flows out of the subcooling portion outlet 302b and the outlet pipe 321.

The receiver-tank 303 has a vertically disposed cylindrical tank main body 331 having a bottom wall constituted by an inlet-and-outlet forming member 332. At an outer periphery of the upper portion of the tank main body 331, an outwardly protruded flange-shaped engaging protrusion 331a is formed (see FIG. 9).

Figure 12:
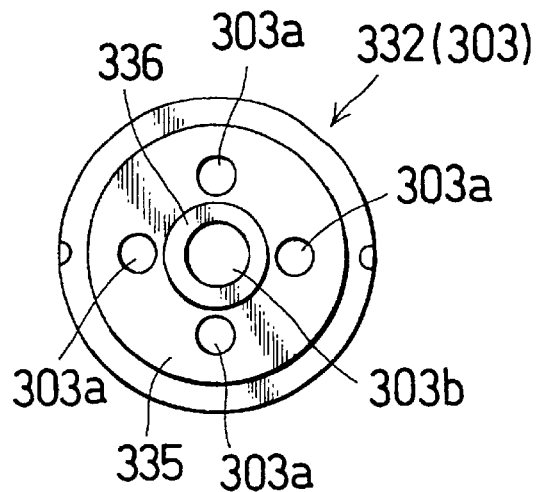
FIG. 12 is a bottom view showing the inlet-and-outlet forming member of the receiver-tank of the heat exchanger according to the third embodiment.

As shown in FIGS. 10 and 12, the inlet-and-outlet forming member 332 is provided with a downwardly protruded inlet convex stepped portion 335 at the lower end thereof. This inlet convex stepped portion 335 has a circular horizontal cross-sectional configuration having an axial center that coincides with the axial center of the receiver-tank 303. Furthermore, at the center of the lower surface of the inlet convex stepped portion 335, a downwardly protruded outlet convex stepped portion 336 is formed. This convex stepped portion 336 also has a circular horizontal cross-sectional configuration having an axial center that coincides with the axial center of the receiver-tank 303.

Furthermore, the inlet convex stepped portion 335 of the inlet-and-outlet forming member 332 is provided with four receiver-tank inlets 303a so as to surround the outlet convex stepped portion 336 at predetermined circumferential intervals. Each of the receiver-tank inlet 303a vertically penetrates the inlet-and-outlet forming member 332 to be communicated with the inside of the tank main body 331. Furthermore, at the central portion of the outlet convex stepped portion 336, a receiver-tank outlet 303b which vertically penetrates along the axis thereof and communicates with the inside of the tank main body 331 is formed.

Here, the total opening area of the four receiver-tank inlets 303a is formed such that the total opening area is larger than the opening area of the receiver-tank outlet 303b.

As shown in FIGS. 9 to 14, in the tank main body 331, a refrigerant suction pipe 330 is disposed vertically with the lower end thereof communicated with the inner end of the receiver tank outlet 303b. The upper end of the refrigerant suction pipe 330 is positioned somewhat higher than the upper surface of the below-mentioned lower desiccant-filled-layer 351.

On the bottom of the tank main body 331, a lower perforated panel 356 is disposed. In the lower inner space of the tank main body 331, a predetermined amount of desiccating spherical particle agents 305 such as molecular sieves are filled to form a lower desiccant-filled-layer 351 as a flow resistance layer surrounding the refrigerant suction pipe 330. On the upper surface of the desiccant-filled-layer 351, a middle perforated panel 357 is disposed via a filter 355.

Furthermore, above the lower desiccant-filled-layer 351 in the tank main body 331, an upper space 354 is formed. In the upper part of the upper space 354, an upper perforated panel 358 is fixed.

Above the upper perforated panel 358, a predetermined amount of desiccating spherical particle agents 305, such as molecular sieves, are filled to form an upper desiccant-filled-layer 352 as desiccating-agent filling members.

In this receiver-tank 303, the refrigerant introduced into the tank main body 331 via the receiver-tank inlet 303a goes up through the lower desiccant-filled-layer 351, and forms a liquid-stagnation R in the upper space 354. Only the liquefied refrigerant is inhaled from the upper end of the refrigerant suction pipe 330 and goes down through the refrigerant suction pipe 330 to be flowed out of the receiver-tank outlet 303b.

On the other hand, as shown in FIGS. 10 and 11, the block flange 304 is integrally provided with a first block 341 to be arranged near the condensing portion outlet 301b, a second block 343 to be arranged near the subcooling portion inlet 302a and a third block 343 to be arranged at the lower end of the receiver-tank 303. The side surface (joining surface) of the first block 341 is connected to the periphery of the condensing portion outlet 301b of the left-hand side header 311. On the other hand, the side surface (joining surface) of the second block 342 is connected to the periphery of the subcooling portion inlet 302a of the left-hand side header 311.

The upper surface of the third block 343 is positioned at the position lower than the position of the condensing portion outlet 301b and corresponding to the upper portion of the subcooling portion 302. Formed on the upper surface of this third block 343 is an inlet concave stepped portion 345 having a circular horizontal cross-sectional configuration into which the inlet convex stepped portion 335 of the aforementioned receiver-tank 303 can fit. Furthermore, at the bottom of the inlet concave stepped portion 345, an outlet concave stepped portion 346 of a circular horizontal cross-sectional configuration into which the outlet convex stepped portion 336 of the receiver-tank 303 is formed.

The block flange 304 is provided with an inlet flow passage 304a for connecting the condensing portion outlet 301b to the receiver-tank inlet 303a and an outlet flow passage 304b for connecting the receiver-tank outlet 303b to the subcooling portion inlet 302a.

The inlet flow passage 304a has an inlet side end portion which opens to the joining surface of the first block 341 and is communicated with the condensing portion outlet 301b, a middle portion which extends downwardly and an outlet side end portion which opens to the lower inner periphery of the inlet concave stepped portion 345 of the third block 343.

The outlet side opening of the aforementioned inlet flow passage 304a is positioned at the bottom portion of the inlet concave stepped portion 345. This position is lower than the portion of the condensing portion outlet 301b, and corresponds to the upper portion of the subcooling portion 302.

On the other hand, the inlet side opening of the outlet flow passage 304b is opened to the bottom surface of the outlet concave stepped portion 346 of the third block 343, and the outlet side opening thereof is opened to the joining surface of the second block 342 and connected to the subcooling portion inlet 302a.

Tightly fitted into the inlet and outlet concave stepped portions 345 and 346 of this block flange 304 are the inlet and outlet convex stepped portion 335 and 336 of the receiver-tank 303. Sealing rings 335a and 336a, such as O-rings, are attached on the periphery of the convex stepped portions 335 and 336. Therefore, The sealing ring 336a air-tightly seals the gap between the inner surface of the outlet concave stepped portion 346 and the exterior surface of the outlet convex stepped portion 336. On the other hand, the sealing ring 335a seals the gap between the inner surface of the inlet concave stepped portion 345 and the external surface of the inlet convex stepped portion 335.

At the bottom portion of the inlet concave stepped portion 345, a gap is formed between the bottom surface of the inlet concave stepped portion 345 and the lower end of the inlet port 303a of the receiver-tank 303 to thereby form a liquid-stagnating portion 340.

The upper portion of the receiver-tank 303 is attached to the left-hand header 311 by a bracket 306. The bracket 306 has a bracket man body 361 and a holding member 362.

Figure 15:
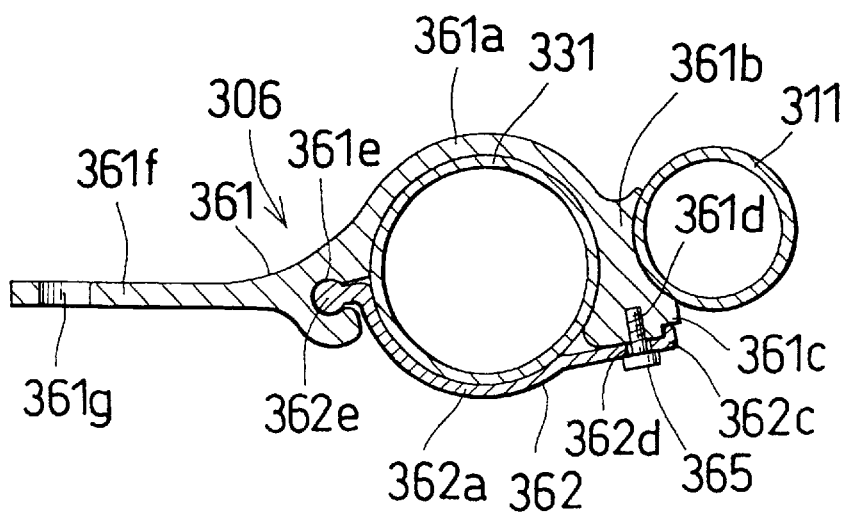
FIG. 15 is a horizontal cross-sectional view showing the bracket and therearound of the heat exchanger of the third embodiment.
Figure 16:
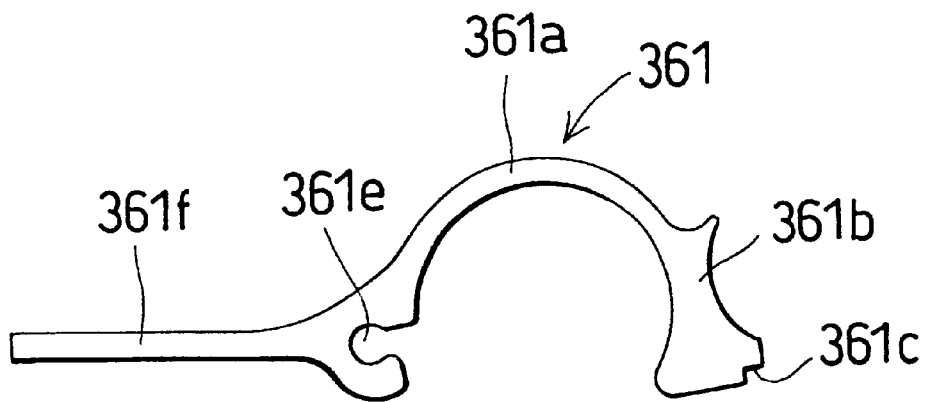
FIG. 16 is a top view showing the bracket main body employed in the third embodiment.
Figure 17:
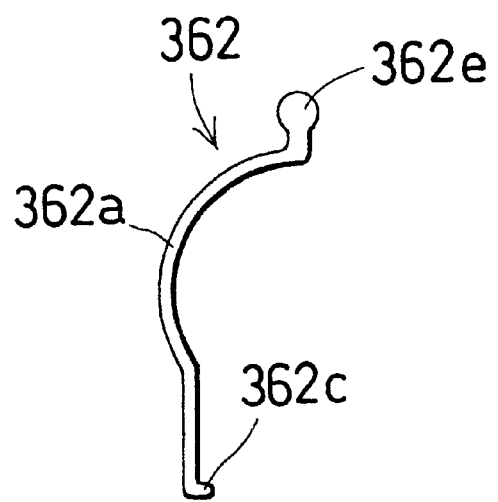
FIG. 17 is a top view showing the covering member of the bracket applied in the third embodiment.

As shown in FIGS. 15 to 17, the bracket main body 361 is provided with an arc-shaped embracing portion 361a which can be fitted on the half-periphery of the tank main body 331 of the receiver-tank 303. At the one end of this embracing portion 361a, a joining portion 361b which can fit on the external surface of the left-hand header 311 of the heat exchanger body 310 is provided.

Furthermore, at the end portion of the joining portion 361b, an engaging stepped portion 361c is formed. In the end surface of the joining portion 361b, a screw hole 361d is formed. Furthermore, at the other end of the embracing portion 361a, an axis-holding groove 361e extending along the longitudinal direction of the receiver-tank 303 is formed. Furthermore, at the other end of the embracing portion 361a, an extended fixing member 361f is formed. At the end portion of this fixing member 361f, an attaching hole 361g is formed.

The embracing portion 361a of this bracket main body 361 is disposed so as to embrace the rear half of the tank main body 331 at the position above the flange-shaped engaging protrusion 331a of the tank main body 331 of the receiver-tank 303. In this state, the joining portion 361b is brazed to the external surface of the left-hand header 311 of the heat exchanger body 310. Thus, the bracket main body 361 is fixed to the left-hand header 311.

On the other hand, the holding member 362 is provided with an arc-shaped embracing portion 362a which can fit on the remaining half periphery of the tank main body 331. At one end of this embracing portion 362a, an engaging protrusion 362c which can engage with the engaging stepped portion 361c of the aforementioned bracket main body 361 is formed. Furthermore, as shown in FIGS. 9 and 15, a vertically extended screw insertion slot 362d which corresponds to the screw hole 362d of the bracket main body 361 is formed. Furthermore, at the other end of the holding member 362, a vertically extended axis portion 362e which can be inserted in the axis-holding groove 361e of the bracket main body 361 in a rotatable manner is provided.

The axis portion 362e of this holding member 362 is inserted into the axis-holding groove 361e of the bracket main body 361 from one end thereof. Thus, the holding member 362 is slidably attached to the bracket main body 361 in a rotatable manner about the axis-holding groove 361e as a fulcrum. Then, the holding member 362 is rotated about the axis portion 362e to fit on the front-half periphery of the tank main body 331. In this situation, a screw 365 is inserted in the screw insertion slot 362d and screws into the screw hole 361d to thereby fix the covering member 362 to the bracket main body 361.

As shown in FIG. 9, the embracing portions 361a and 362a of the bracket 306 are engaged with the upper surface of the flange-shaped engaging protrusion 331a of the tank main body 331 to thereby downwardly press the tank main body 331.

The aforementioned heat exchanger with the receiver-tank is used together with a compressor, a decompressing means and an evaporator as a condenser for use in an automobile air-conditioning refrigeration system. In this refrigeration cycle, the gaseous refrigerant of high temperature and high pressure compressed by the compressor and introduced from the condensing portion inlet (not shown) passes through the condensing portion 301 while exchanging heat with the ambient air to be condensed, and flows out of the condensing portion outlet 301b.

The refrigerant flowed from the condensing portion outlet 301b is introduced into the inlet concave stepped portion 345 through the inlet flow passage 304a of the block flange 304, and forms liquid stagnation in the liquid-stagnating portion 340 of the bottom of the concave stepped portion 345.

Figure 13:
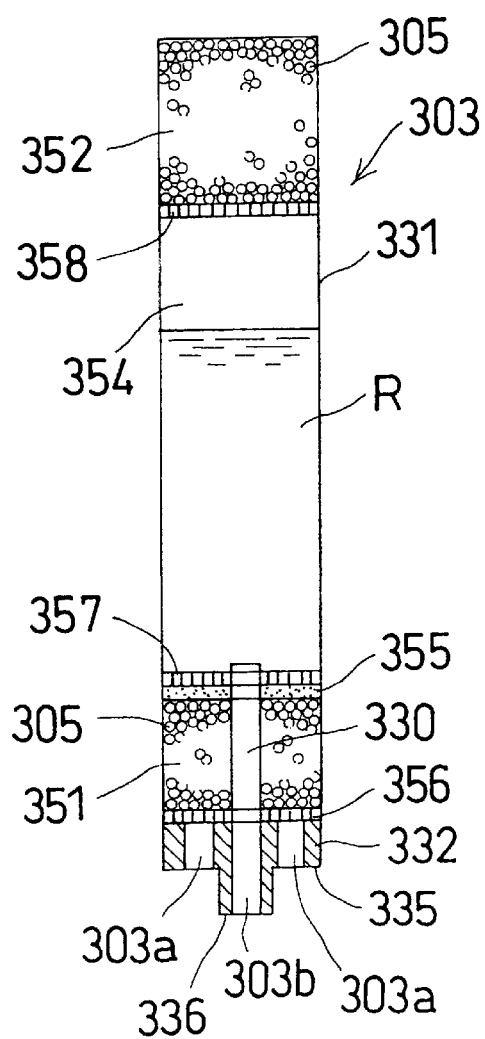
FIG. 13 is a schematic cross-sectional view showing the receiver-tank of the third embodiment.
Figure 14:
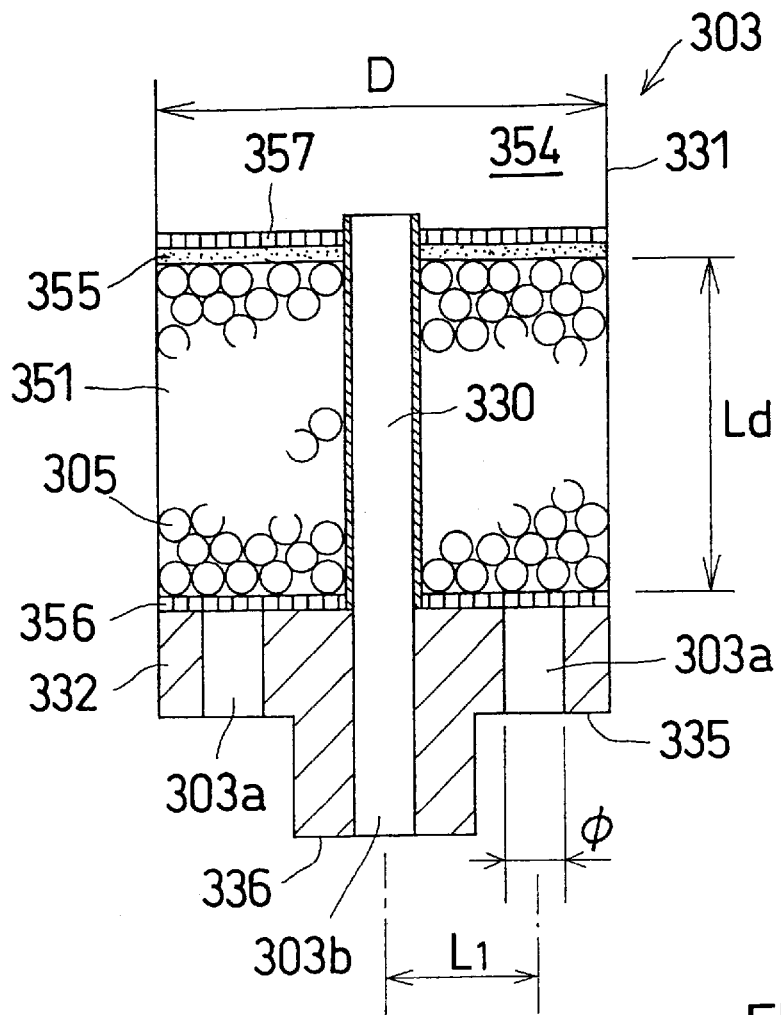
FIG. 14 is an enlarged schematic cross-sectional view showing the lower portion of the receiver-tank of the third embodiment.

As shown in FIGS. 13 and 14, the liquefied refrigerant stagnated in the liquid-stagnating portion 340 is introduced into the tank main body 331 through the receiver-tank inlet 303a and spread horizontally in a wide area, and then goes up through the lower desiccant-filled-layer 351 at a reduced speed. At the time of the rising of the refrigerant, since the lower desiccant-filled-layer 351 functions as a resistance layer to the refrigeration flow, the upstream flow velocity is reduced remarkably. The refrigerant passing through between the particle-shaped desiccating agents 305 changes its direction frequently to take a long course. Therefore, the flow velocity reduces remarkably and a local high velocity flow also disappears due to the rectification function, resulting in a uniform upstream flow.

Thus, the liquefied refrigerant introduced into the upper space 354 forms liquid-stagnation R without causing turbulence. On the other hand, the flow velocity of the gas (gaseous refrigerant) introduced or generated in the liquefied refrigerant passing through the lower desiccant-filled-layer 305 is also abruptly reduced when the gaseous refrigerant passes through the desiccant-filled-layer 351. Accordingly, when the gaseous refrigerant reaches the liquid-stagnation R, it calmly goes up in the liquid-stagnation R and accumulates as gaseous refrigerant above the surface thereof without disturbing the surface.

Only the liquid refrigerant stably stagnated at the bottom among the liquid refrigerant forming the liquid-stagnation R flows into the refrigerant suction pipe 330, and then is introduced into the subcooling zone 302 through the outlet flow passage 304b of the block flange 304.

The liquefied refrigerant introduced in the subcooling portion 302 passes through the subcooling portion 302 to be subcooled by the ambient air, and then flows out of the subcooling-portion outlet 302 band the outlet pipe 321. Thereafter, the subcooled refrigerant passes through an evaporator and a compressor in this turn. Thus, the refrigerant circulates in the refrigeration cycle.

As mentioned above, in the heat exchanger with the receiver-tank according to this embodiment, the condensed refrigerant introduced into the receiver-tank 303 forms the liquid-stagnation R quietly at a low speed, and bubbles will disappear smoothly and efficiently. Therefore, the stable range of amount of sealed refrigerant can be expanded, and only the stable liquefied refrigerant can be extracted assuredly. Accordingly, since a stable supply of the liquefied refrigerant into the subcooling portion 302 can be performed, the refrigeration cycle can be operated stably and an outstanding refrigeration performance can be obtained.

Furthermore, since the stable supply of the liquefied refrigerant can be attained because of the expanded stable range, a small and slim receiver-tank 303 can be obtained and the performance can be improved, resulting in a small, lightweight and high-performance refrigeration system and in a reduced amount of refrigerant.

In this embodiment, it is preferable to satisfy the following condition: Ld<D, wherein "Ld" is the height of the lower desiccant-filled-layer 351 and "D" is the inner diameter of the tank main body 331.

That is, in cases where the height Ld is too high, the liquid-stagnation start position of the refrigerant is high. As a result, the stable range starting point at the fewer sealed amount side of the refrigerant becomes high, causing a narrow stable range. On the other hand, in cases where the height Ld is too low, the aforementioned resistance function and/or rectification function, etc. by the lower desiccant-filled-layer 351 cannot fully be obtained, resulting in inadequate extraction of the stable liquefied refrigerant.

In this embodiment, since the desiccating agent 305 is divided into the lower desiccant-filled-layer 351 and the upper desiccant-filled-layer 352, the predetermined amount of desiccating agent 305 can be obtained assuredly. Therefore, the drying treatment of the refrigerant can be fully performed.

In this embodiment, it is preferable that the following conditions are satisfied: $1.5\phi \leq L1 \leq 0.8D$, wherein the inner diameter of the tank main body 331, the distance between the center of the receiver-tank inlet port 303a and the center of the receiver-tank outlet 303b and the inner diameter of the inlet port 303a of the tank main body 331 are defined by D, L1 and $\phi$, respectively.

In this case, since the opening center of the receiver-tank inlet port 303a and the outlet center of the receiver-tank outlet 303b are moderately apart from each other, the upstream flow of the refrigerant introduced from the receiver-tank inlet port 303a will not be concentrated on the center of the tank main body 331 (receiver-tank outlet side), which further reduces the refrigerant flow velocity and further stabilizes the refrigerant surface. On the other hand, when the distance L is too short or too long, the refrigerant introduced from the receiver-tank inlet 303a will concentrate on the center of the tank main body 331, resulting in unstable extraction of the liquefied refrigerant.

Furthermore, in this embodiment, since the liquid-stagnating portion 340 is formed at the outlet end of the inlet flow passage 304a in the block flange 304, the refrigerant is once stored in the liquid-stagnating portion 340 and only the liquefied refrigerant is introduced in the tank main body 331 through the receiver-tank inlet 303a. Accordingly, a mixing of the gaseous refrigerant into the tank main body 330 can be prevented more assuredly, and the receiver-tank 330 can extract the liquefied refrigerant in more stabilized manner. This further enhances the refrigeration performance.

Furthermore, in this embodiment, since the total opening area of the receiver-tank inlets 303a is formed to be larger than the opening area of the receiver-tank outlet 303b, the flow velocity of the refrigerant can be reduced within the receiver-tank inlet 303a and gas generation in the refrigerant can be prevented. Accordingly, bubble-extinguishing can be further improved, resulting in a further enhanced refrigeration performance.

In addition to the above, a plurality of receiver-tank inlets 303a are formed in the inlet-and-outlet forming member 332 disposed at predetermined circumferential intervals. Therefore, the refrigerant can be introduced into the tank main body 331 from the periphery of the inlet-and-outlet forming member 332 in an evenly distributed manner. Furthermore, it becomes possible to effectively prevent a generation of bubbles due to drift and/or turbulence of the refrigerant, resulting in a further enhanced refrigeration performance.

[Fourth Embodiment]

Figure 18:
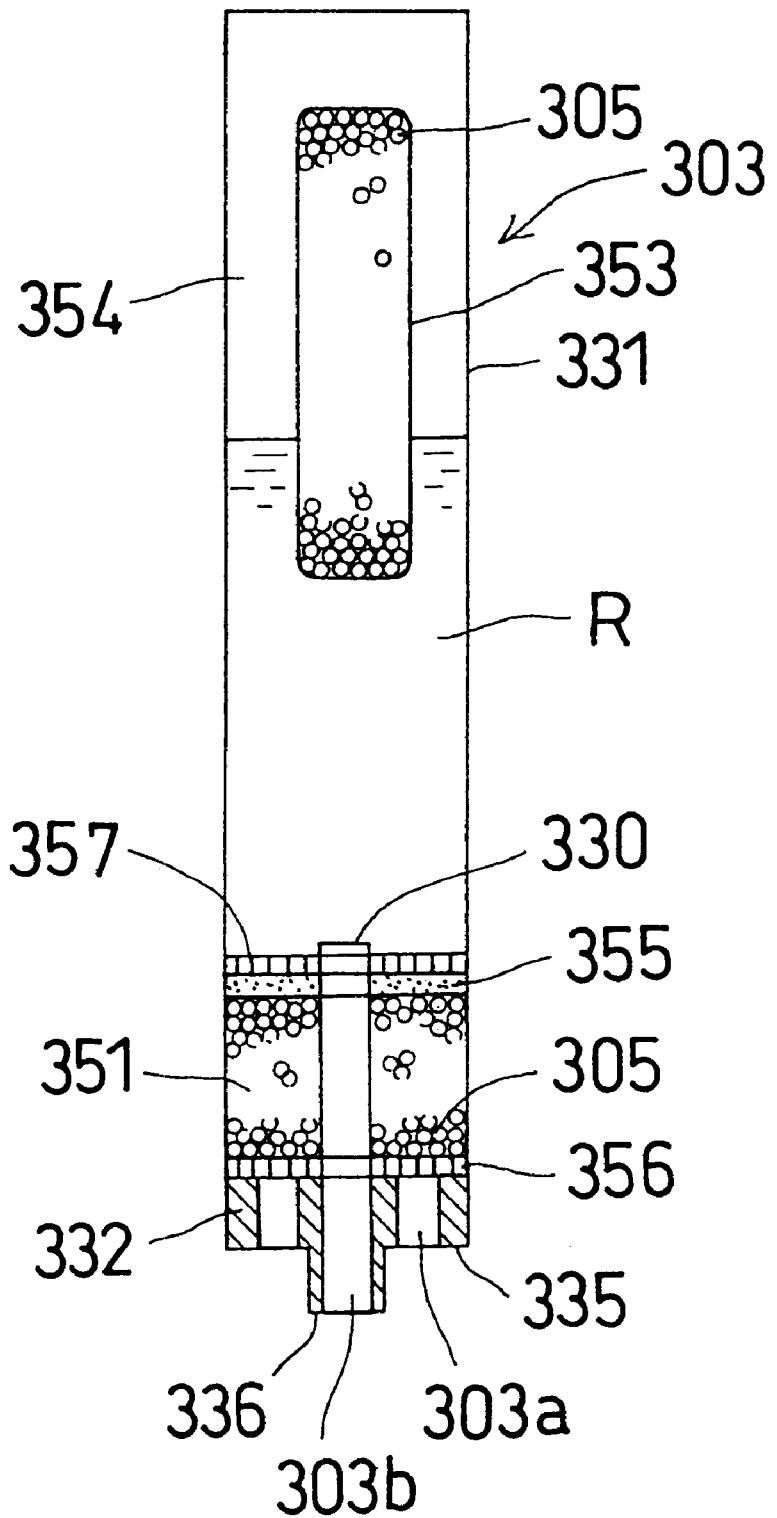
FIG. 18 is a schematic front cross-sectional view showing a receiver-tank for use in a refrigeration system according to a fourth embodiment.

FIG. 18 is a schematic cross-sectional view showing a receiver-tank for refrigeration systems according to a fourth embodiment of the present invention. As shown in FIG. 18, in this receiver tank 303 according to this embodiment, in place of the upper desiccant-filled-layer 352 shown in FIG. 13, a package-type desiccating-agent-filled member 305 is disposed in the tank main body 331 so that it floats in the liquid-stagnation R.

The package-type desiccating-agent-filled member 305 includes a net-bag member and particle-shaped desiccating agents filled in the net-bag member. The other structures are the same as those of the third embodiment. According to the receiver tank 303 of this fourth embodiment, the same effects as mentioned above can be obtained.

[Fifth Embodiment]

Figure 19:
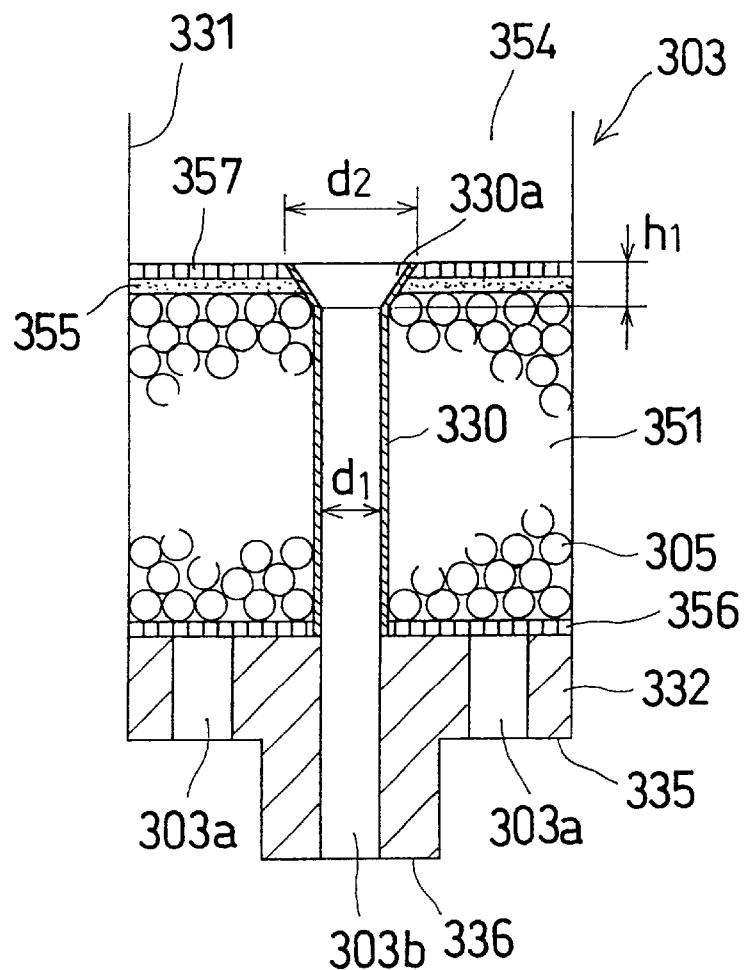
FIG. 19 is a schematic front cross-sectional view showing a lower portion of a receiver-tank for use in a refrigeration system according to a fifth embodiment.

FIG. 19 is a schematic cross-sectional view showing a lower portion of a receiver-tank for refrigeration system according to a fifth embodiment of the present invention.

As shown in FIG. 19, in the receiver-tank 303 of this embodiment, the inlet opening portion (upper end) of the refrigerant suction pipe 330 is formed to be an enlarged-diameter-portion 330a in the shape of a bell which opens upwardly. The upper level of the enlarged-diameter-portion 330a is positioned at the same height as the upper surface of the perforated panel 357 arranged on the lower desiccant-filled-layer 351. The other structures are the same as those of the aforementioned embodiment.

According to the receiver-tank 303 of the fifth embodiment, the same effects as mentioned above can be obtained. Furthermore, since the upper end portion of the enlarged-diameter-portion 330a of the refrigerant suction pipe 330 is formed as a concave portion on the lower desiccant-filled-layer 351, the liquefied refrigerant easily flows into the suction pipe 330 and the flow velocity in the enlarged-diameter-portion 330a becomes slower than that in the non-enlarged-diameter-portion of the suction pipe 330. Therefore, even if gaseous refrigerant is introduced into the suction pipe 330, the gaseous refrigerant escapes upwardly when the liquefied refrigerant passes through the enlarged-diameter-portion 330a slowly, resulting in a stable supply of the liquefied refrigerant.

In addition, it is not necessary to form the enlarged-diameter-portion 330a of the refrigerant suction pipe 330 into a bell-shaped configuration having a diameter gradually expanded. For example, as shown in FIG. 20A, the enlarged-diameter-portion 330a may have a discontinuously expanded structure.

Figures 20A, 20B:
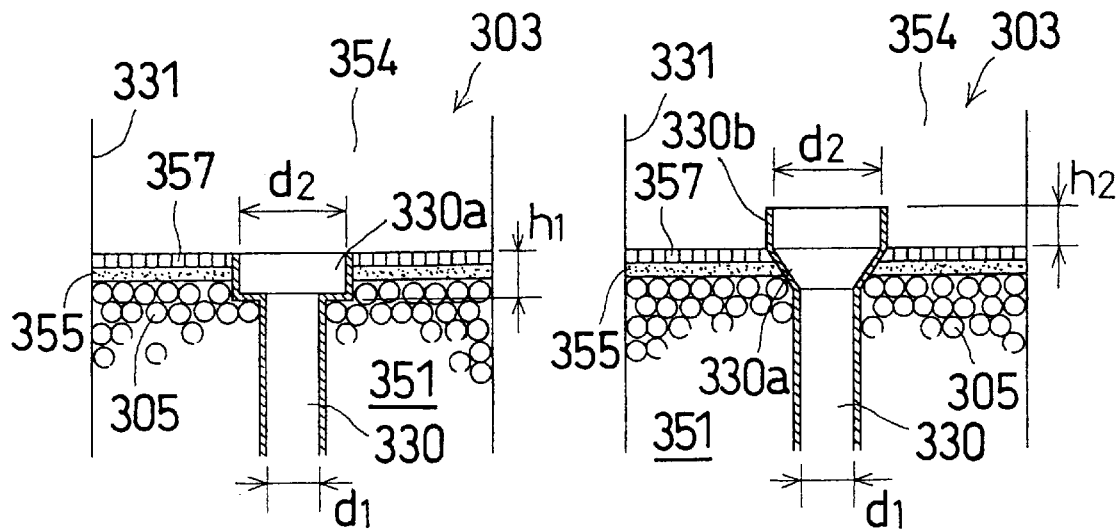
FIG. 20A is a cross-sectional view showing the upper portion of the desiccant-filled-layer of the receiver-tank according to a first modification of the fifth embodiment.
FIG. 20B is a cross-sectional view showing the upper portion of the desiccant-filled-layer of the receiver-tank according to a second modification of the fifth embodiment.

In order to effectively obtain the functions caused by the enlarged-diameter-portion 330a of the refrigerant suction pipe 330, as shown in FIGS. 19 and 20A, it is recommended to satisfy the following conditions: $d1<d2\leq3d1$, and $d1<h1\leq5d1$, wherein the inner diameter of the non-enlarged-diameter-portion of the inlet of the refrigerant suction pipe 330, the maximum opening diameter of the enlarged-diameter-portion 330a and the depth of the enlarged-diameter-portion 330a are defined by d1, d2 and h1, respectively.

FIG. 20B shows another modification. In this receiver-tank 303, a bubble-swallow-prevention wall 330b of a cylindrical shape is formed at the opening peripheral edge of the enlarged-diameter-portion 330a of the refrigerant suction pipe 330.

According to this modification, bubbles of the gaseous refrigerant going up through the liquid-stagnation R is hardly swallowed from the upper end of the refrigerant suction pipe 330, resulting in a further steady supply of the liquefied refrigerant.

In order to effectively obtain the function of the bubble-swallow-prevention wall 330b without causing any interruption of the liquefied refrigerant flow into the receiver-tank outlet 303b, it is preferable that the following condition is satisfied: $h2<2d1$, wherein the inner diameter of the refrigerant suction pipe 330 and the height of the bubble-swallow-prevention wall 330b are defined by d1 and h2, respectively.

In the aforementioned embodiments, although the present invention is applied to a heat exchanger with a receiver-tank connected to a heat exchanger body having a subcooling portion, especially to the subcooling system condenser, the present invention is not limited to the above. The present invention can also be applied to a heat exchanger with a receiver tank connected to a heat exchanger body having no subcooling portion, such as a condenser with a receiver-tank, as well as to a receiver-tank to be disposed separate to a heat exchanger.

[Sixth Embodiment]

Figure 24:
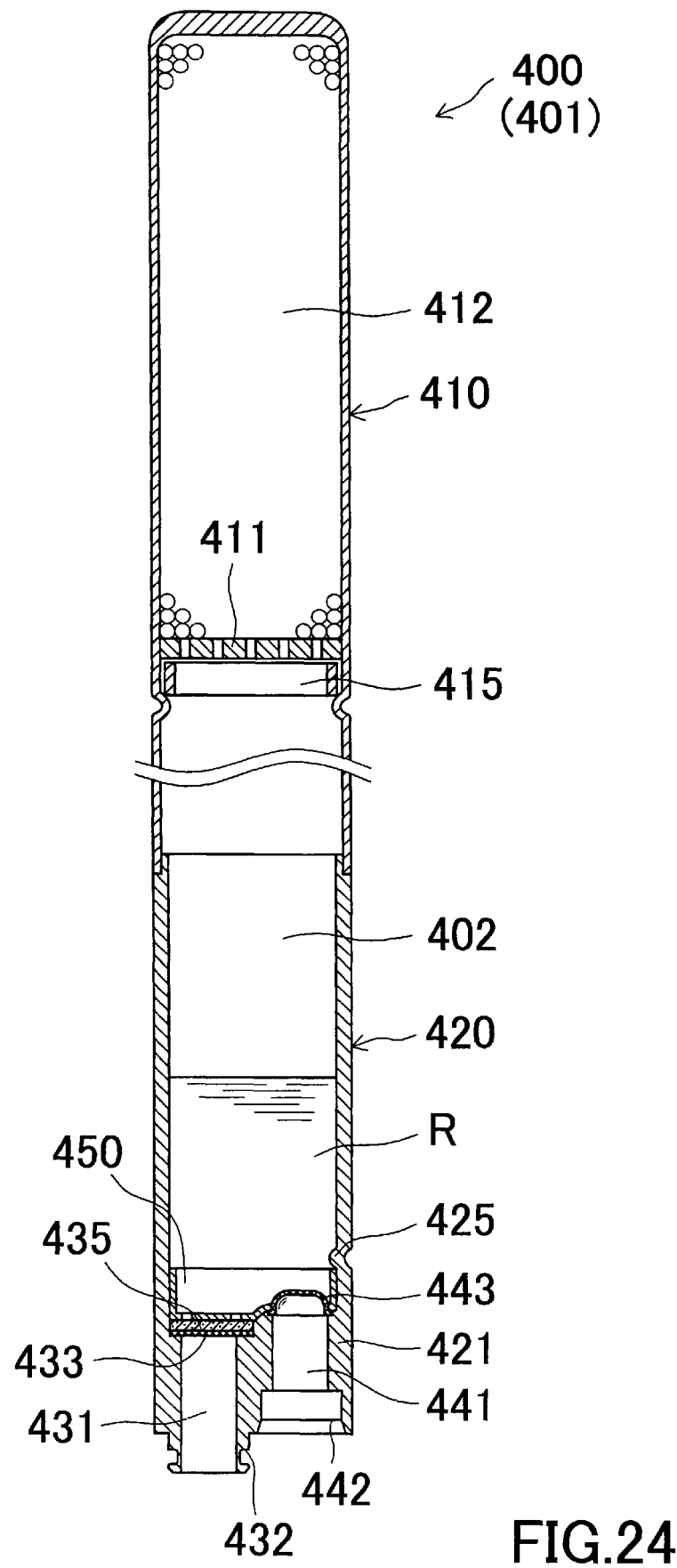
FIG. 24 is a front cross-sectional view showing a receiver tank for use in a refrigeration system according to a sixth embodiment of the present invention.
Figure 25:
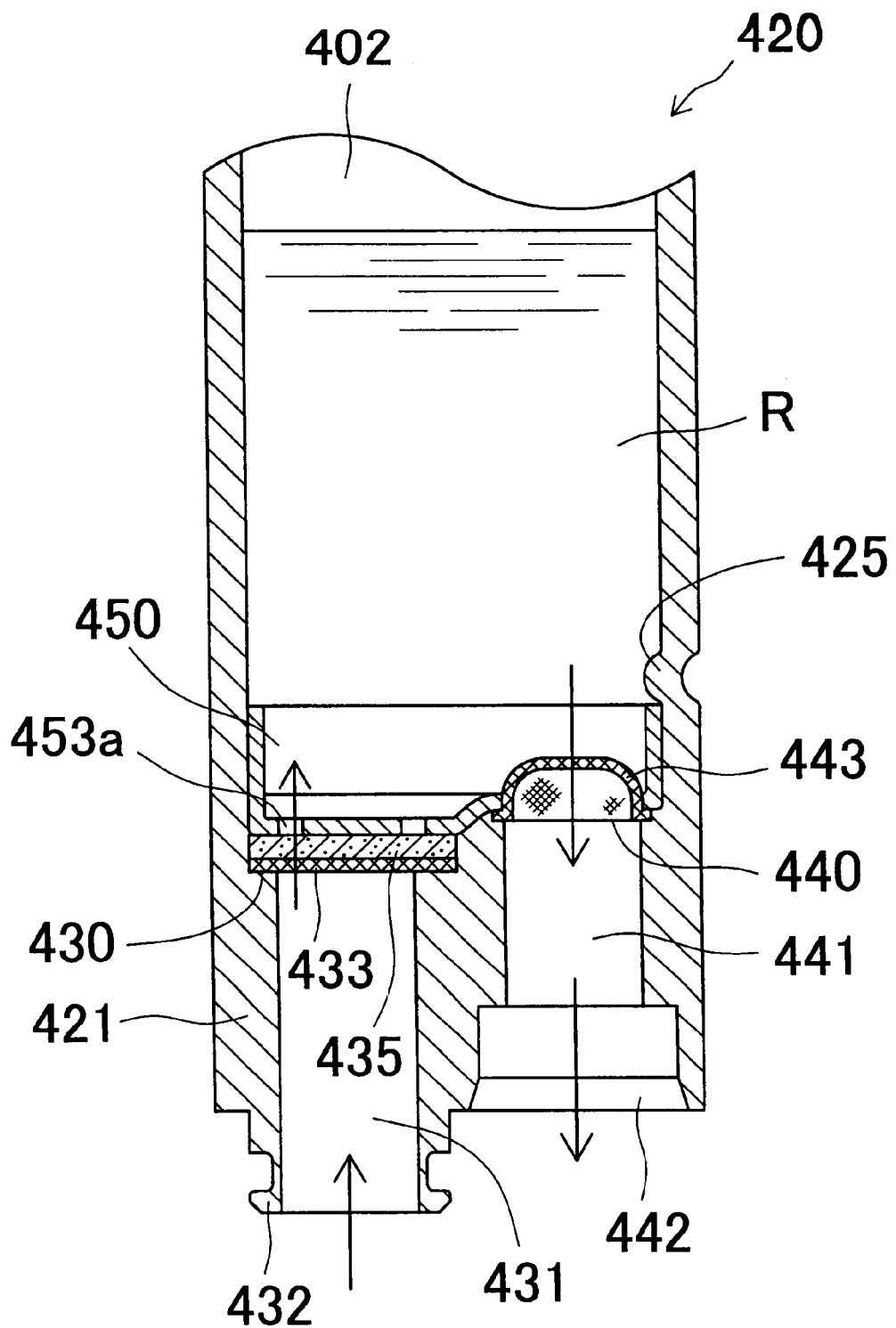
FIG. 25 is a front cross-sectional view showing the inlet and outlet members of the receiver tank according to the sixth embodiment.
Figure 26:
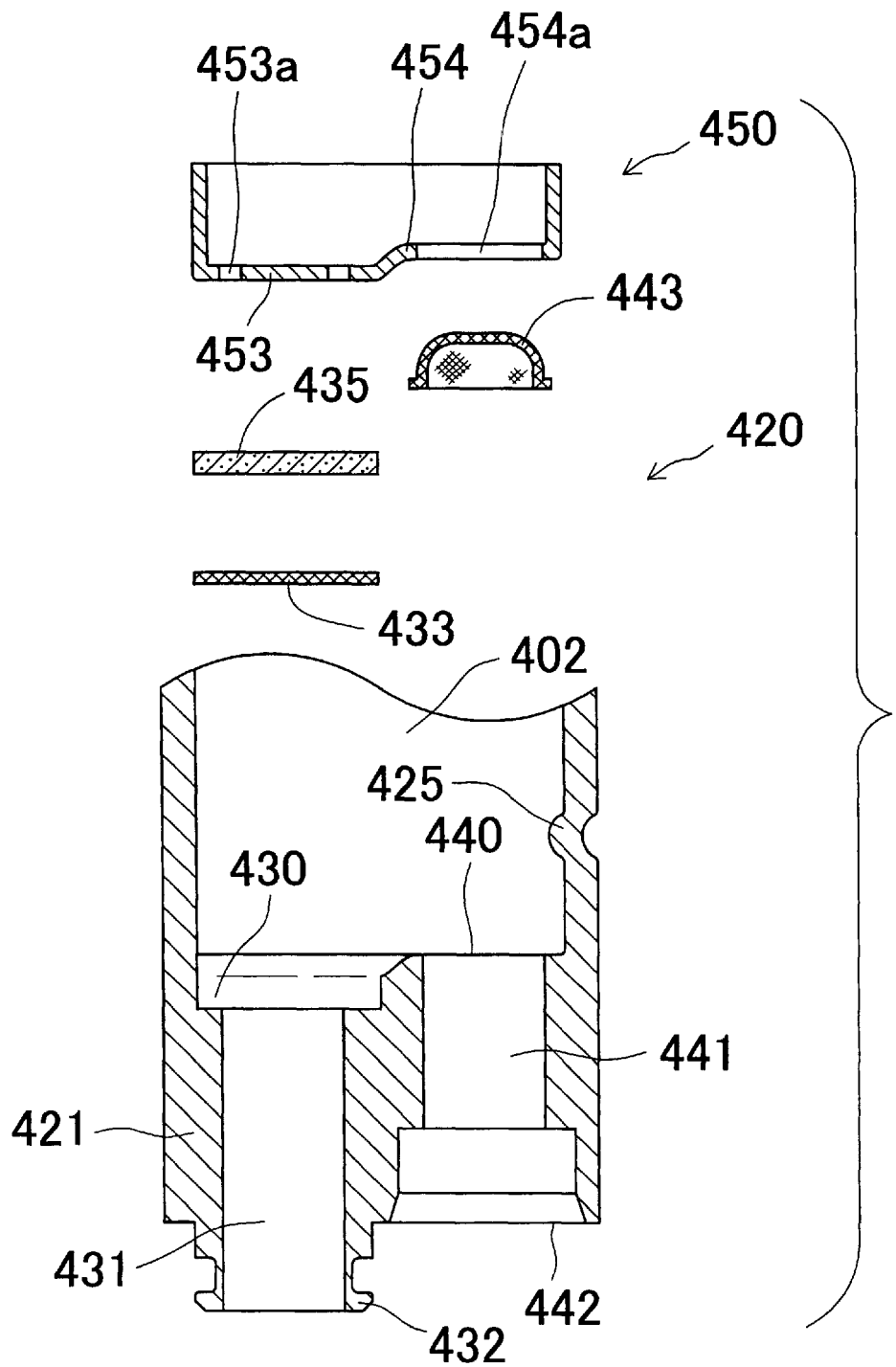
FIG. 26 is an exploded front cross-sectional view showing the inlet-and-outlet forming member of the sixth embodiment.
Figure 27:
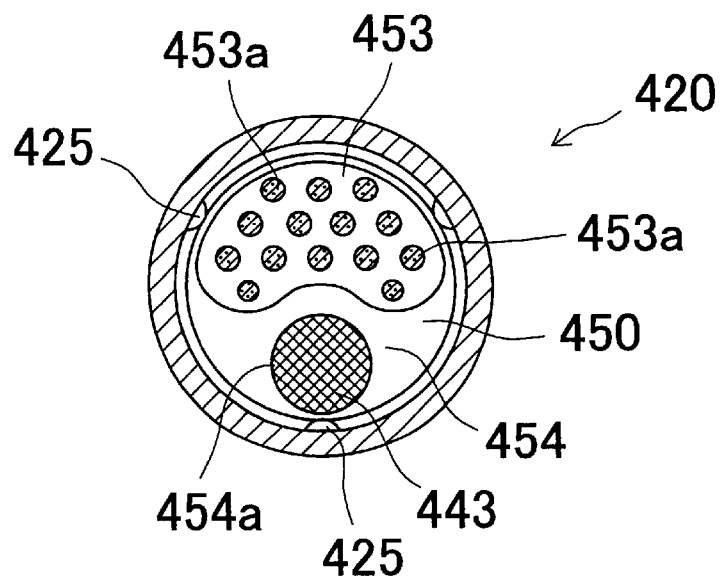
FIG. 27 is a horizontal cross-sectional view showing the inlet-and-outlet forming member of the sixth embodiment.

FIG. 24 is a front cross-sectional view showing a receiver-tank 400 for refrigeration systems according to a sixth embodiment of the present invention. As shown in this figure, this receiver-tank 400 is constituted by a tank main body 401 including a main tank member 410 constituting the upper and intermediate portion of the tank main body 401 and an inlet-and-outlet forming member 420 constituting the lower end portion of the tank main body 401.

The main tank member 410 is formed into a vertically elongated cylindrical shape having a closed upper end and an opened lower end.

The inlet-and-outlet forming member 420 is formed into a cylindrical shape having an opened upper end and a lower end closed by a bottom wall 421.

As shown in FIGS. 24 to 28, the half upper surface of the bottm wall 421 of the inlet-and-outlet forming member 420 is formed into a downwardly dented portion constituting a low-level dented portion 430, and the rest thereof is formed into a flat portion constituting a high-lever flat portion 440.

The bottom wall 421 of the inlet-and-outlet forming member 420 is provided with a receiver-tank inlet 431 vertically penetrating the bottom wall at a portion corresponding to the dented portion 430. The upper end of this receiver-tank inlet 431 is opened at the bottom surface of the dented portion 430. Furthermore, at the region of the bottom wall 421 corresponding to the receiver-tank inlet 431, a downwardly protruded inlet connecting protrusion 432 is formed. At the lower end surface of this connecting protrusion 432, the lower end of the receiver-tank inlet 431 is opened.

The bottom wall 421 of the inlet-and-outlet forming member 420 is provided with a receiver-tank outlet 441 vertically penetrating the bottom wall at a portion corresponding to the high-level flat portion 440. The upper end of this receiver-tank outlet 441 is opened at the high-level flat portion. Furthermore, in the region of the bottom wall 421 corresponding to the receiver-tank outlet 441, an upwardly dented output connecting concave portion 442 is formed. At the bottom surface of this concave portion 442, the lower end of the receiver-tank outlet 441 is opened.

In this embodiment, the receiver-tank inlet 431 constitutes a refrigerant incoming inlet, while the receiver-tank outlet 441 constitutes a refrigerant outgoing outlet. Furthermore, the receiver-tank outlet 441 corresponds to the suction pipe in each of the aforementioned embodiments.

On the bottom of the low-level dented portion 430 of the inlet-and-outlet forming member 420, a refrigerant permeable sheet 433 made of a metal mesh sheet is disposed so as to cover the receiver-tank inlet 431. On the upper surface of this refrigerant permeable sheet 433, a nonwoven fabric filtering layer 435 is disposed in order to decrease the flow velocity.

On the upper surface of the high-level flat portion 440 of the bottom wall 421 constituting the inlet-and-outlet forming member 420, a hat-shaped refrigerant permeable member 443 is disposed so as to cover the upper end of the receiver-tank outlet 441.

On the upper side of the bottom wall 421 of the refrigerant inlet-and-outlet forming member 420, a pressing member 450 is disposed. This pressing member 450 is a metal press molded member having a round bottom wall and a peripheral wall upwardly extending from the periphery of the bottom wall. This pressing member 450 has a size capable of being fitted in the refrigerant inlet-and-outlet forming member 420.

The first half region 453 of the bottom wall of the pressing member 450 is formed into a downwardly protruded portion corresponding to the low-lever dented portion 430, and provided with a number of refrigerant passing apertures 453a. The remaining second half region 454 thereof is provided with an opening 454a corresponding to the receiver-tank outlet 441.

This pressing member 450 is inserted in the inlet-and-outlet forming member 420 from the upper end opening thereof, so that the filtering layer 435 is pressed down by the pressing member 450. The peripheral portion of the refrigerant permeable member 443 is held down from the above by the peripheral portion of the opening of the second half region 454 in a state in which the refrigerant permeable member 443 faces the opening 454a of the second half region 454. In this state, the projection 425 formed on the inner peripheral surface of the inlet-and-outlet forming member 420 engages with the upper end of the peripheral wall portion of the pressing member 450, whereby the pressing member 450 is held in the state in which the pressing member 450 is pressed against the bottom wall 421 of the inlet-and-outlet forming member 420.

Figure 28:
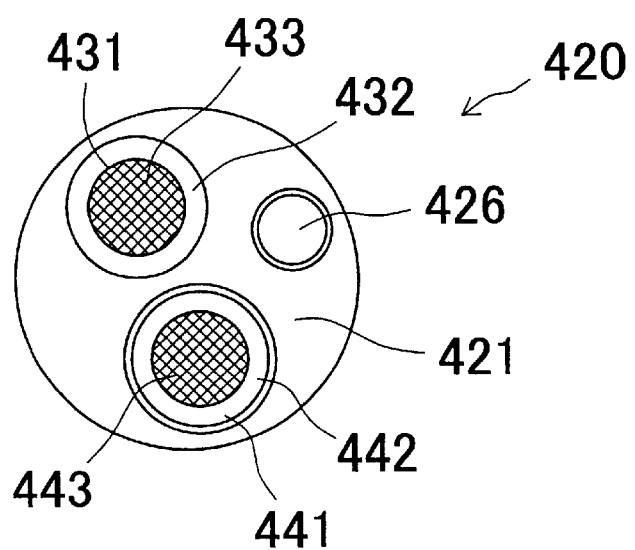
FIG. 28 is a bottom view showing the inlet-and-outlet forming member of the sixth embodiment.

As shown in FIG. 28, a screw hole 426 is formed in the lower surface of the inlet-and-outlet forming member 420. This screw hole 426 is used to fix the receiver-tank 400 to a block flange (not shown) attached to the heat exchanger.

As shown in FIG. 24, a perforated panel 411 is fixed in the upper part of the main tank member 410 via a fixing member 415. A predetermined amount of desiccating agents of spherical particle shape, such as molecular sieves, is filled in the upper part of the main tank member 410 above the perforated panel 411, so that an upper desiccant-filled-layer 412 as a desiccating-agent member is formed. The upper desiccant-filled-layer 412 differs from the flow-resistance layer of the present invention.

The receiver-tank 400 of this embodiment is formed by fixing the upper end opening of the aforementioned inlet-and-outlet forming member 420 to the lower end opening of this main tank member 410.

For example, this receiver-tank 400 is attached to a heat exchanger like the third embodiment shown in FIG. 9.

In detail, a block flange is fixed to one of headers of a heat exchanger, while the lower surface of the receiver-tank 400 is fixed to the upper end of the block flange. In this state, the condensing portion of the heat exchanger is connected to the inlet port 431 of the receiver-tank 400 in fluid communication via the block flange, while the receiver-tank outlet 441 is connected to the subcooling portion of the heat exchanger in fluid communication via the block flange.

The heat exchanger with a receiver-tank fabricated as mentioned above is used as a condenser of a refrigeration system for air conditioning of automobiles together with a compressor, a decompressing means and an evaporator. In this refrigeration cycle, the gaseous refrigerant of high temperature and high pressure compressed by the compressor flows into the inlet 431 of the receiver-tank 400 through the refrigerant inlet flow passage of the block flange after being condensed by the condensing portion of the heat exchanger.

The refrigerant flowed into the receiver-tank inlet 431 passes through the refrigerant permeable sheet 433, and goes up via the filtering layer 435. During the up-stream flow of the refrigerant, the filtering layer 435 functions as a flow resistance layer against the refrigerant flow, which remarkably deteriorates the up-stream flow speed of the refrigerant. Furthermore, the refrigerant goes up through the fibers of the non-woven fabric constituting the filtering layer 435 while changing the flow direction. Accordingly, the local high-speed refrigerant flow is suppressed due to the rectification function of the filtering layer 435. Then, the refrigerant passes through the refrigerant passing aperture 453a of the pressing member 450 as an entirely homogenized up-stream flow, and flows into the upper space 402.

The liquefied refrigerant introduced into the upper space 402 as mentioned above forms liquid-stagnation R without causing any turbulance. Gases (gaseous refrigerant) mixed and/or generated in the liquefied refrigerant going up through the filtering layer 435 are suddenly decreased in the up-stream speed when going up through the filtering layer 435, and reach the liquid-stagnation R. Then, the gases go up in the liquid-stagnation and distinguishes at the liquid surface without causing any tubrulance of the liquid surface. Thus, the gases stagnate above the liquid surface as gaseous refrigerant.

Only the stable liquefied refrigerant stored in the bottom portion among the liquefied refrigerant constitituing the liquid-stagnation R passes through the refrigerant permeable member 443 of the pressing member 450, and then introduced into the receiver-tank outlet 441. Thus, the refrigerant introduced into the receiver-tank outlet 441 passes through the refrigerant outlet passage of the block flange to be introduced into the subcooling portion of the heat exchanger.

Furthermore, the liquefied refrigerant introduced in the subcooling portion passes through the subcooling portion to be subcooled therein. Thereafter, the subcooled refrigerant passes through a decompressing means, an evaporator, and a compressor in this order. Thus, the refrigerant circulates within the refrigeration cycle.

As mentioned above, according to this embodiment, the condensed refrigerant introduced into the receiver-tank 400 slowly forms the liquid-stagnation R quietly and the bubbles distinguish efficiently. Therefore, the stability range of the sealed refrigerant amount can be expanded, and only the stable liquefied refrigerant can be extracted more assuredly. Accordingly, the liquefied refrigerant can be stably supplied to the subcooling portion of the heat exchanger, resulting in a stable refrigeration operation, which in turn enables superior refrigeration performance. Furthermore, since the enlarged stability range enables a stable supply of liquefied refrigerant, the receiver-tank 400 can be miniaturized and enhanced in performance, which in turn enables to decrease the size and weight of the entire refrigeration system, enhance the performance thereof, and decrease the amount of refrigerant required therein.

In the aforementioned embodiment, the aforementioned receiver-tank 400 is attached to the heat exchanger integrally provided with a subcooling portion. However, the present invention is not limited to the above. In the present invention, the receiver-tank 400 may be attached to a heat exchanger with no subcooling portion.

Furthermore, it is not necessary to attach the receiver-tank 400 to a heat exchanger via a block flange. The receiver-tank 400 may be attached to a heat exchanger via refrigerant tubes, etc.

Furthermore, in the aforementioned embodiment, the desiccant-filled-layer 412 is provided in the upper end portion of the tank main body 401. However, the present invention is not limited to the above. In the present inveniton, the desiccant-filled-layer 412 may be fixed in the intermediate portion or the lower portion of the tank main body 401. Furthermore, as shown in FIG. 18, the desiccant-agent-layer may be arranged in the tank main body in a floatable manner.

Furthermore, it is not necessary to employ a nonwoven fabric as the filtering layer 435. Other fiber entangled member, such as a woven fabric or a kintted fabric, may be employed as the filtering layer 435. Furthermore, besides fiber members, desiccating agents such as molecular sieves, may also be employed. In short, any materials may be employed as long as it gives resistance to the refrigerant flow.

EXAMPLES

Figure 21:
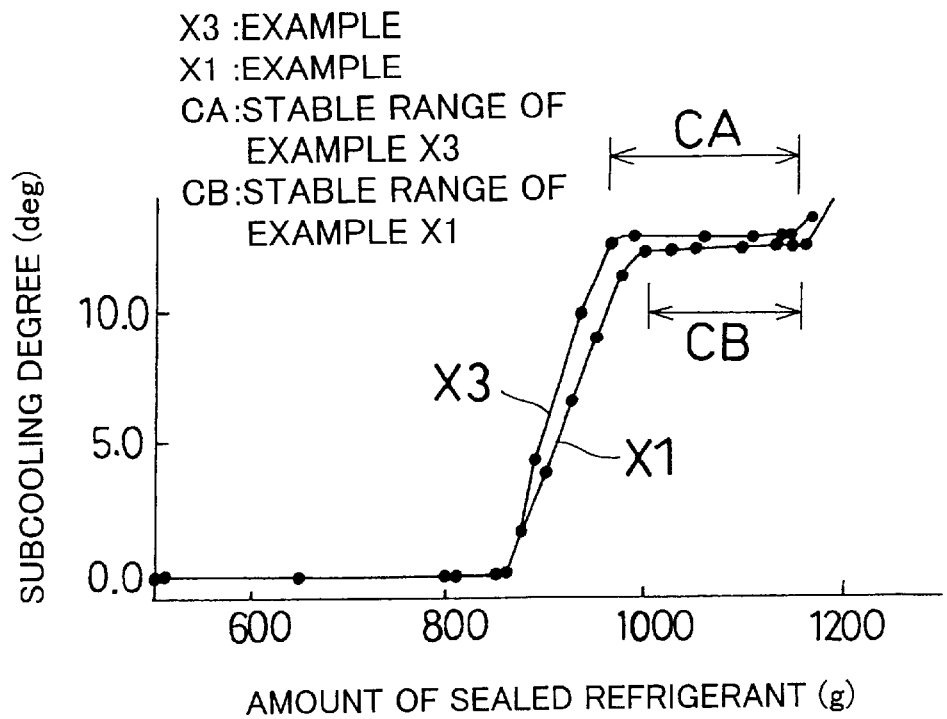
FIG. 21 is a graph showing the relationship between a subcooling degree of a condensed refrigerant and an amount of sealed refrigerant obtained by a charge test in a refrigeration cycle.
Figure 22:
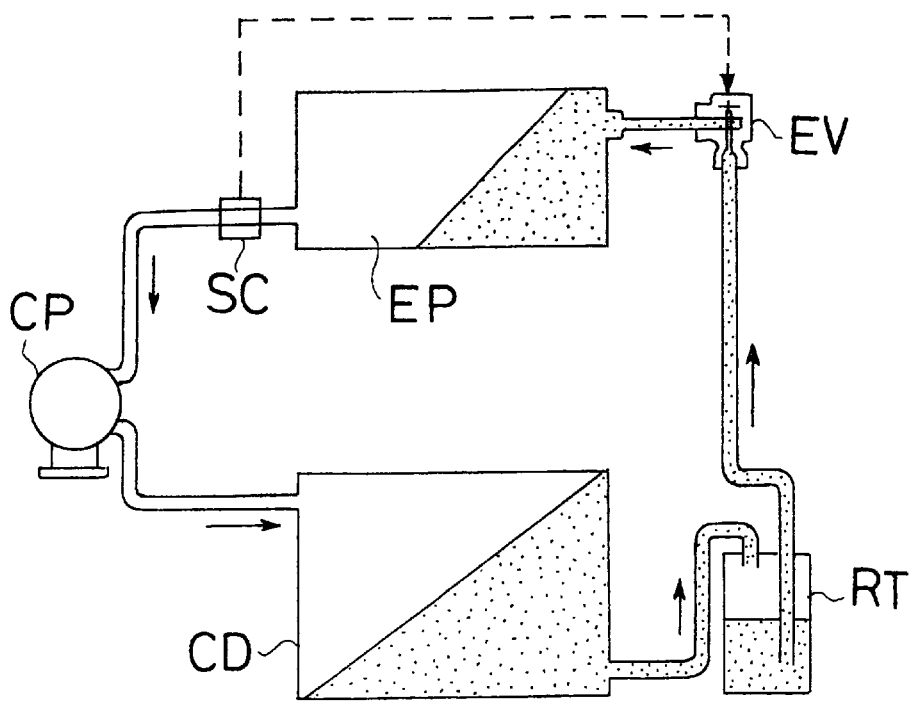
FIG. 22 is a refrigerant circuit diagram of a refrigeration cycle.
Figure 23A:
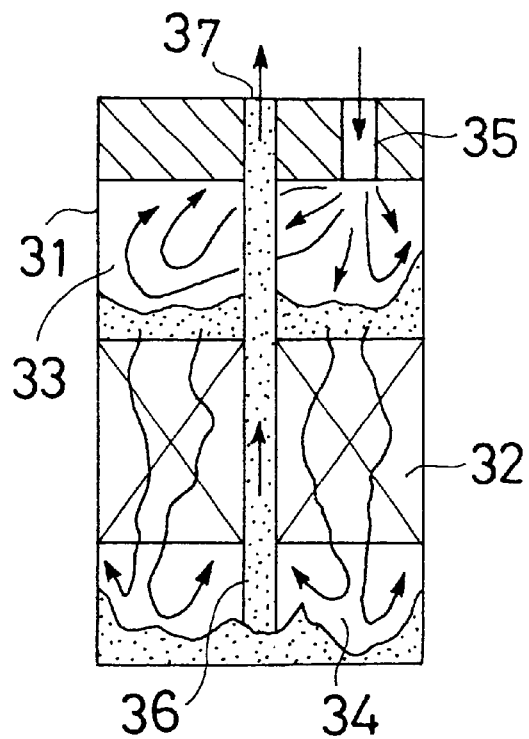
FIG. 23A is a schematic vertical cross-sectional view of a first conventional receiver-tank.
Figure 23B:
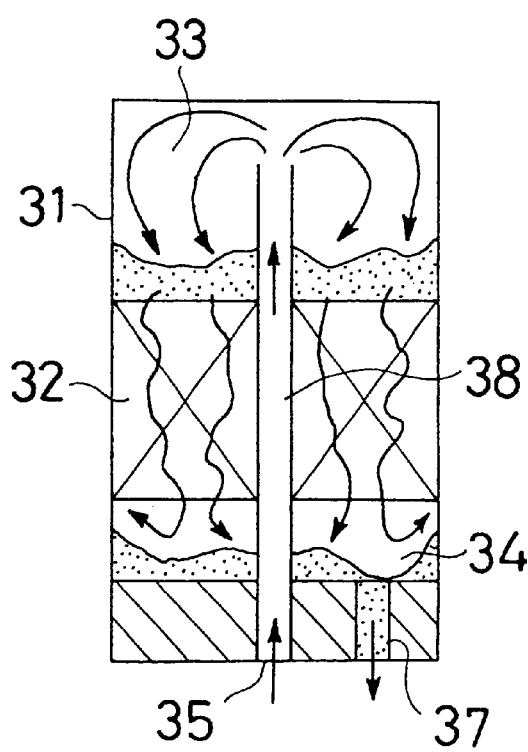
FIG. 23B is a schematic vertical cross-sectional view of a second conventional receiver-tank.
Figure 23C:
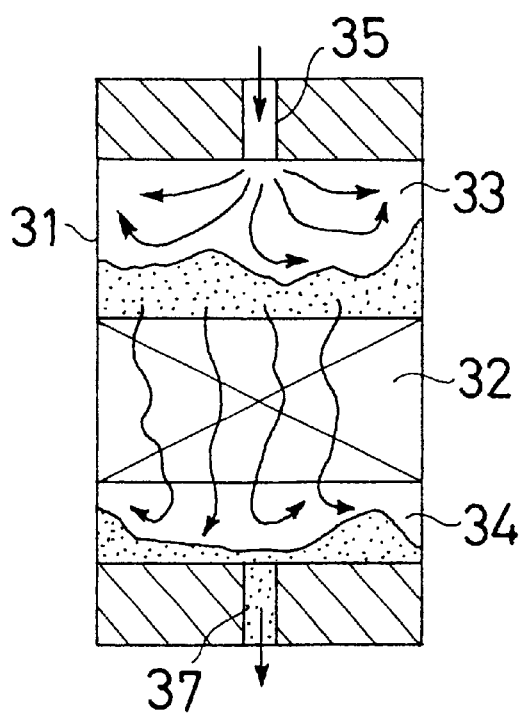
FIG. 23C is a schematic vertical cross-sectional view of a third conventional receiver-tank.
Figure 23D:
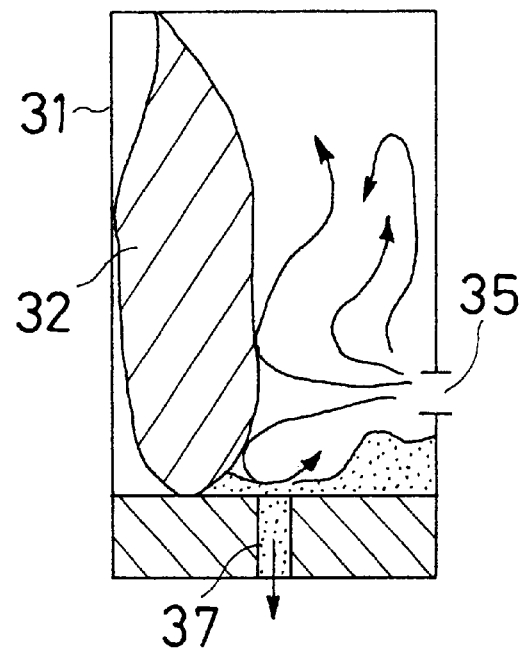
FIG. 23D is a schematic vertical cross-sectional view of a fourth conventional receiver-tank.

A refrigeration system employing the heat exchanger with a receiver-tank shown in FIGS. 9 to 13 was prepared as an example X3. A refrigeration system having the same structure as the above system except for employing the receiver-tank shown in FIG. 2 was prepared as an example X1. Then, the relation between the subcooling-degree ° C. of the condensed refrigerant and the sealed amount g of the refrigerant was measured by a charge examination. The results are shown in the graph of FIG. 21.

As shown in this graph, as compared with the example X1, in the example X3, the subcooling degree sharply goes up when the subcooling degree begins to go up, and reaches the stable range starting point (bubble extinguish point) at the side of fewer amount of sealed refrigerants. Thus, it is understood that the stable range CA of the example X3 is clearly larger than the stable range CB of the example X1.

Concretely, the bubble disappear point of the example X3 was about 970 g, and that of the example X1 was decreased by about 30 g as compared with the bubble disappear point (about 1000 g) of the example X1.

In addition, in the refrigeration system employing the receiver-tank of the fourth embodiment shown in FIG. 18, the same charge examination was performed. The result was the same as the aforementioned example X3.

This application claims priority to Japanese Patent Application No. 2000-244199 filed on Aug. 11, 2000, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A receiver-tank for use in a refrigeration cycle, wherein condensed refrigerant is introduced into said receiver-tank and accumulated therein and only liquefied refrigerant flows out of said receiver-tank, said receiver-tank, comprising:
    a tank main body having a refrigerant inlet and a refrigerant outlet each provided in a bottom wall of said tank main body;
    a flow-resistance layer for reducing a flow velocity of refrigerant passing through said flow-resistance layer, said flow-resistance layer being provided in said tank main body such that an upper space is formed above said flow-resistance layer;
    a suction pipe provided in said tank main body, said suction pipe having an upper end opened toward said upper space and a lower end communicated with said refrigerant outlet, whereby refrigerant introduced into said tank main body via said refrigerant inlet passes through said flow-resistance layer upward to cause liquid stagnation of liquefied refrigerant in said upper space, and the liquefied refrigerant flows out of said refrigerant outlet via said suction pipe, and
    wherein said suction pipe is constituted by said refrigerant outlet.

2. The receiver-tank for use in a refrigeration cycle as recited in claim 1, wherein said flow-resistance layer is provided with a plurality of dispersing passages for dispersing the refrigerant in a radial and outward direction of said tank main body.

3. The receiver-tank for use in a refrigeration cycle as recited in claim 1, wherein said flow-resistance layer is a filtering layer constituted by a fiber tangled member.

4. The receiver-tank for use in a refrigeration cycle as recited in claim 1, wherein a dented portion is formed in a region of an upper surface of said bottom wall of said tank main body corresponding to said refrigerant inlet, and said flow-resistance layer is disposed in said dented portion.

5. The receiver-tank for use in a refrigeration cycle as recited in claim 4, wherein a refrigerant permeable sheet constituted by a mesh sheet is disposed at a position of a bottom surface of said dented portion corresponding to said refrigeration inlet.

6. The receiver-tank for use in a refrigeration cycle as recited in claim 4, wherein a pressing member for downwardly pressing said flow-resistance layer is provided in said tank main body, wherein refrigerant passage apertures are provided in said pressing member corresponding to said flow-resistance layer, and wherein an opening corresponding to said refrigerant outlet is provided in said pressing member.

7. The receiver-tank for use in a refrigeration cycle as recited in claim 6, wherein a refrigerant permeable member constituted by a mesh sheet is disposed in a refrigerant passage opening of said pressing member.

8. The receiver-tank for use in a refrigeration cycle as recited in claim 1, wherein a desiccant-filled-layer is disposed in an upper space of said tank main body in a fixed manner.

9. The receiver-tank for use in a refrigeration cycle as recited in claim 1, wherein a desiccant-filled-member is disposed freely in an upper space of said tank main body.

10. A heat exchanger with a receiver-tank, comprising:
    a heat exchanger body including a pair of headers disposed in parallel at a certain distance, a plurality of heat exchanging tubes with both ends thereof connected to said pair of headers in fluid communication and a condensing portion outlet for discharging refrigerant condensed while passing through said heat exchanging tubes;
    a receiver-tank having a receiver-tank inlet and a receiver-tank outlet each formed in a bottom wall of said receiver-tank, said receiver-tank accumulating refrigerant introduced from said receiver-tank inlet and discharging only liquefied refrigerant from said receiver-tank outlet; and
    a refrigerant passage for introducing the refrigerant flowed out of said condensing portion outlet into said receiver-tank inlet,
    wherein a flow-resistance layer for reducing a flow velocity of refrigerant passing through said flow-resistance layer is provided in said receiver-tank such that an upper space is formed above said flow-resistance layer, wherein a suction pipe is provided in said receiver-tank, said suction pipe having an upper end opened toward said upper space and a lower end communicated with said receiver-tank outlet, whereby refrigerant introduced into said receiver-tank via said receiver-tank inlet passes through said flow-resistance layer upward to cause liquid stagnation of liquefied refrigerant in said upper space, and the liquefied refrigerant flows out of said receiver-tank outlet via said suction pipe, and
    wherein said suction pipe is constituted by said refrigerant-tank outlet.

11. The heat exchanger with a receiver-tank as recited in claim 10, wherein said flow-resistance layer is provided with a plurality of dispersing passages for dispersing the refrigerant in a radial and outward direction of said tank main body.

12. The heat exchanger with a receiver-tank as recited in claim 10, wherein said flow-resistance layer is a filtering layer constituted by a fiber tangled member.

13. The heat exchanger with a receiver-tank as recited in claim 10, wherein a dented portion is formed in a region of an upper surface of said bottom wall of said tank main body corresponding to said refrigerant inlet, and said flow-resistance layer is disposed in said dented portion.

14. The heat exchanger with a receiver-tank as recited in claim 10, wherein a desiccant-filled-layer is disposed in an upper space of said tank main body in a fixed manner.

15. The heat exchanger with a receiver-tank as recited in claim 10, wherein a desiccant-filled-member is disposed freely in an upper space of said tank main body.

16. A heat exchanger with a receiver-tank, comprising:
    a heat exchanger body including a pair of headers disposed in parallel at a certain distance, a plurality of heat exchanging tubes with both ends thereof connected to said pair of headers in fluid communication, partitioning members each partitioning an inside of said header to thereby group said plurality of heat exchanging tubes into a condensing portion and a subcooling portion, a condensing portion outlet for discharging refrigerant condensed while passing through said heat exchanging tubes and a subcooling portion inlet for introducing refrigerant into said subcooling portion;

a receiver-tank having a receiver-tank inlet and a receiver-tank outlet each formed in a bottom wall of said receiver-tank, said receiver-tank accumulating refrigerant introduced from said receiver-tank inlet and discharging only liquefied refrigerant from said receiver-tank outlet; and a refrigerant passage for introducing the refrigerant discharged from said condensing portion outlet into said receiver-tank inlet and introducing the refrigerant discharged from said receiver-tank outlet into said sub-cooling portion inlet, wherein a flow-resistance layer for reducing a flow velocity of refrigerant passing through said flow-resistance layer is provided in said receiver-tank such that an upper space is formed above said flow-resistance layer, wherein a suction pipe is provided in said receiver-tank, said suction pipe having an upper end opened toward said upper space and a lower end communicated with said receiver-tank outlet, whereby refrigerant introduced into said receiver-tank via said receiver-tank inlet passes through said flow-resistance layer upward to cause liquid stagnation of liquefied refrigerant in said upper space, and the liquefied refrigerant flows out of said receiver-tank outlet via said suction pipe, and wherein said suction pipe is constituted by said refrigerant-tank outlet.

17. The heat exchanger with a receiver-tank as recited in claim 16, wherein said flow-resistance layer is provided with a plurality of dispersing passages for dispersing the refrigerant in a radial and outward direction of said tank main body.

18. The heat exchanger with a receiver-tank as recited in claim 16, wherein said flow-resistance layer is a filtering layer constituted by a fiber tangled member.

19. The heat exchanger with a receiver-tank as recited in claim 16, wherein a dented portion is formed in a region of an upper surface of a bottom wall of said tank main body corresponding to said refrigerant inlet, and wherein said flow-resistance layer is disposed in said dented portion.

20. The heat exchanger with a receiver-tank as recited in claim 16, wherein a desiccant-filled-layer is disposed in an upper space of said tank main body in a fixed manner.

21. The heat exchanger with a receiver-tank as recited in claim 16, wherein a desiccant-filled-member is disposed freely in an upper space of said tank main body.

22. A condensing apparatus for use in a refrigeration cycle, said condensing apparatus, comprising:

a condenser including a condensing portion for condensing refrigerant and a condensing portion outlet for discharging the refrigerant condensed by said condensing portion;

a receiver-tank having a receiver-tank inlet and a receiver-tank outlet each formed in a bottom wall of said receiver-tank, said receiver-tank accumulating refrigerant introduced from said receiver-tank inlet and discharging only liquefied refrigerant from said receiver-tank outlet; and a refrigerant passage for introducing the refrigerant flowed out of said condensing portion outlet into said receiver-tank inlet, wherein a flow-resistance layer for reducing a flow velocity of refrigerant passing through said flow-resistance layer is provided in said receiver-tank such that an upper space is formed above said flow-resistance layer, wherein a suction pipe is provided in said receiver-tank, said suction pipe having an upper end opened toward said upper space and a lower end communicated with said receiver-tank outlet, whereby refrigerant introduced into said receiver-tank via said receiver-tank inlet passes through said flow-resistance layer upward to cause liquid stagnation of liquefied refrigerant in said upper space, and the liquefied refrigerant flows out of said receiver-tank outlet via said suction pipe, and wherein said suction pipe is constituted by said refrigerant-tank outlet.

23. The heat exchanger with a receiver-tank as recited in claim 22, wherein said flow-resistance layer is provided with a plurality of dispersing passages for dispersing the refrigerant in a radial and outward direction of said tank main body.

24. The heat exchanger with a receiver-tank as recited in claim 22, wherein said flow-resistance layer is a filtering layer constituted by a fiber tangled member.

25. The heat exchanger with a receiver-tank as recited in claim 22, wherein a dented portion is formed in a region of an upper surface of the bottom wall of said tank main body corresponding to said refrigerant inlet, and wherein said flow-resistance layer is disposed in said dented portion.

26. The heat exchanger with a receiver-tank as recited in claim 22, wherein a desiccant-filled-layer is disposed in an upper space of said tank main body in a fixed manner.

27. The heat exchanger with a receiver-tank as recited in claim 22, wherein a desiccant-filled-member is disposed freely in an upper space of said tank main body.

* * * * *